United States Patent [19]

Benson et al.

[11] Patent Number: 5,814,796

[45] Date of Patent: Sep. 29, 1998

[54] TERMINAL FOR ISSUING AND PROCESSING DATA-BEARING DOCUMENTS

[75] Inventors: Terrence R. Benson, Redondo Beach; Richard Jablonski, Rancho Palos Verdes; Lawrence V. Maldarelli, Tustin; Howard Siu, South San Gabriel, all of Calif.

[73] Assignee: Mag-Tek, Inc., Carson, Calif.

[21] Appl. No.: 594,812

[22] Filed: Jan. 31, 1996

[51] Int. Cl.$^6$ .............................. G06K 1/00; G06K 19/06
[52] U.S. Cl. ............................. 235/375; 235/380
[58] Field of Search ...................... 235/375, 380

[56] References Cited

U.S. PATENT DOCUMENTS

| | | | |
|---|---|---|---|
| 3,931,643 | 1/1976 | Kuroe | 360/128 |
| 4,825,054 | 4/1989 | Rust et al. | 235/380 |
| 5,229,586 | 7/1993 | Ishii | 235/375 |
| 5,266,781 | 11/1993 | Warwick et al. | 235/380 |
| 5,401,111 | 3/1995 | Nubson et al. | 400/701 |

FOREIGN PATENT DOCUMENTS

WO 92/17856  10/1992  WIPO .................. 235/380

*Primary Examiner*—F. L. Evans
*Attorney, Agent, or Firm*—Darby & Darby, P.C.

[57] ABSTRACT

A card issuing and processing system embodied in a terminal to accomplish issuing and processing operations on cards bearing both human-readable and machine-readable data, e.g., cards bearing visual indicia, one or more magnetic stripes, and/or an integrated circuit ("chip") is provided, having an input hopper mechanism for storing and dispensing new cards, multiple transport mechanisms for transporting the cards, and various processing stations, including a cleaning station, an IC station, a magnetic-write station, a magnetic-read station, and a print station. The cleaning station cleans the surface of the card in preparation for a subsequent operation. The IC station accomplishes electronic data transfer with cards bearing a chip. The magnetic-write and read stations accomplish magnetic data transfer with cards bearing either high and/or low coercivity magnetic medium, and the print station accomplishes the application of visual data, including graphic images, text, background designs, or even bar codes. Input/output devices, including a PIN selection device, or modems may be used with the terminal as appropriate. Image capturing devices may also be used with the terminal to provide pictorial data such as a photo-image or security logo for the card.

25 Claims, 24 Drawing Sheets

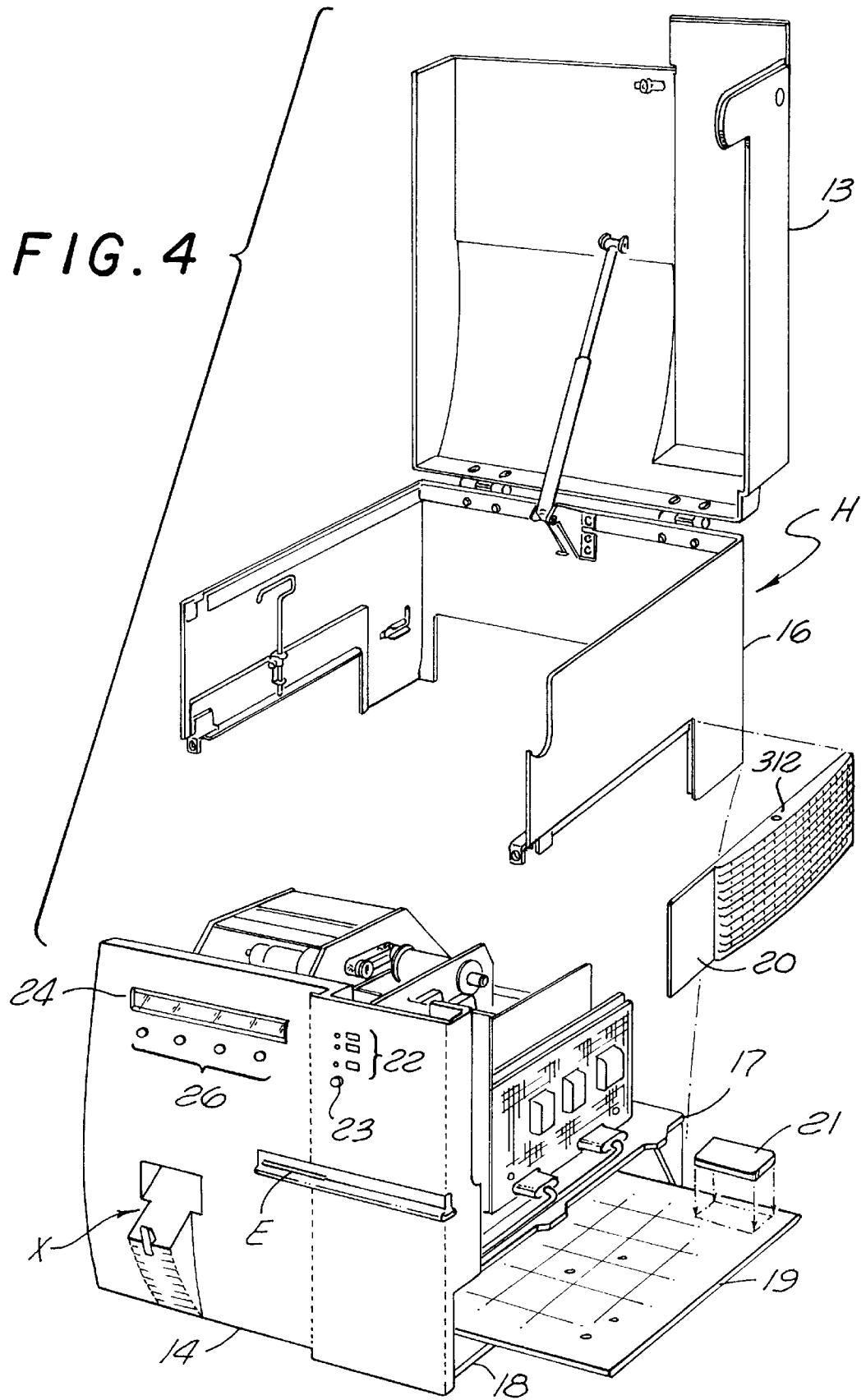

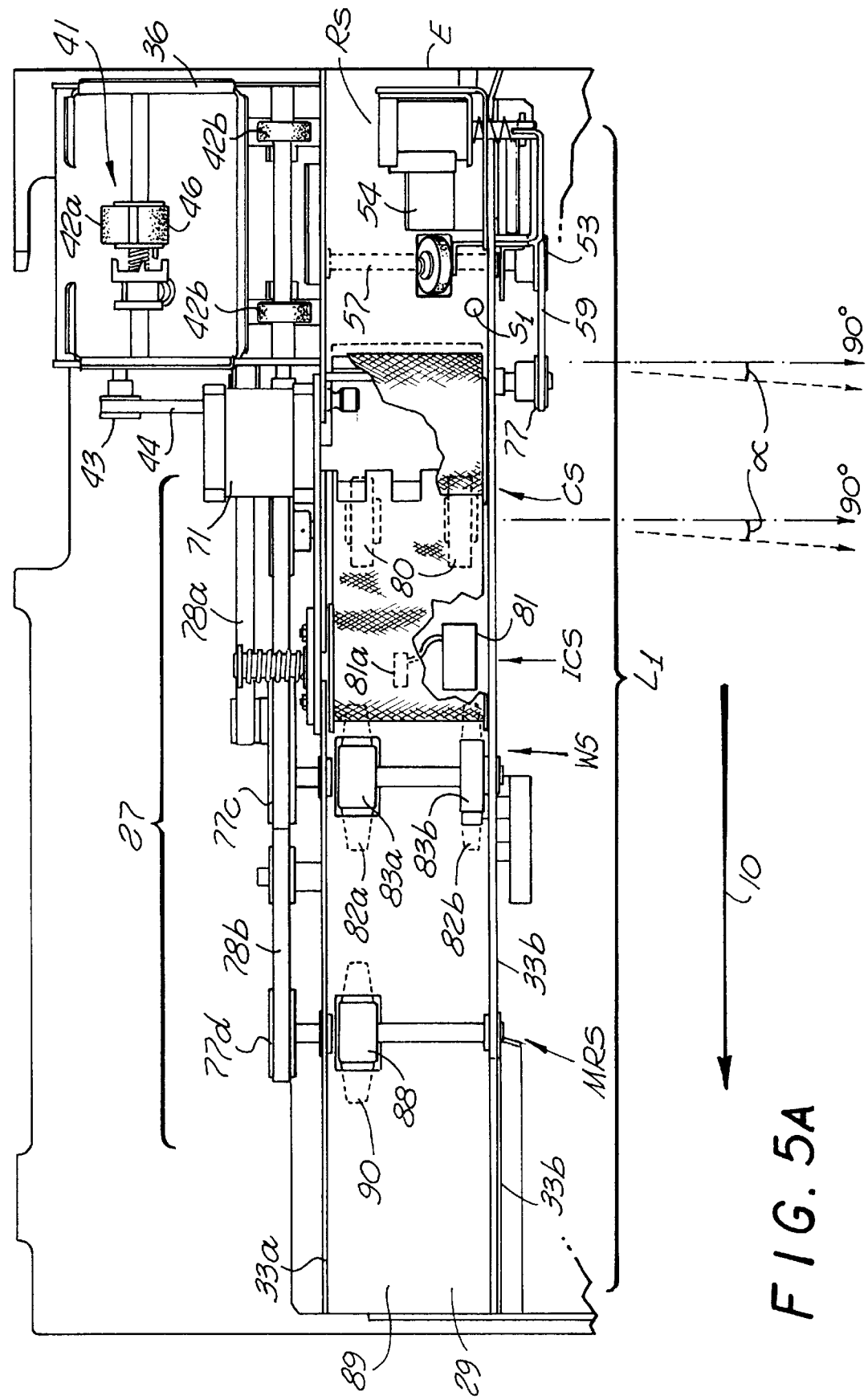

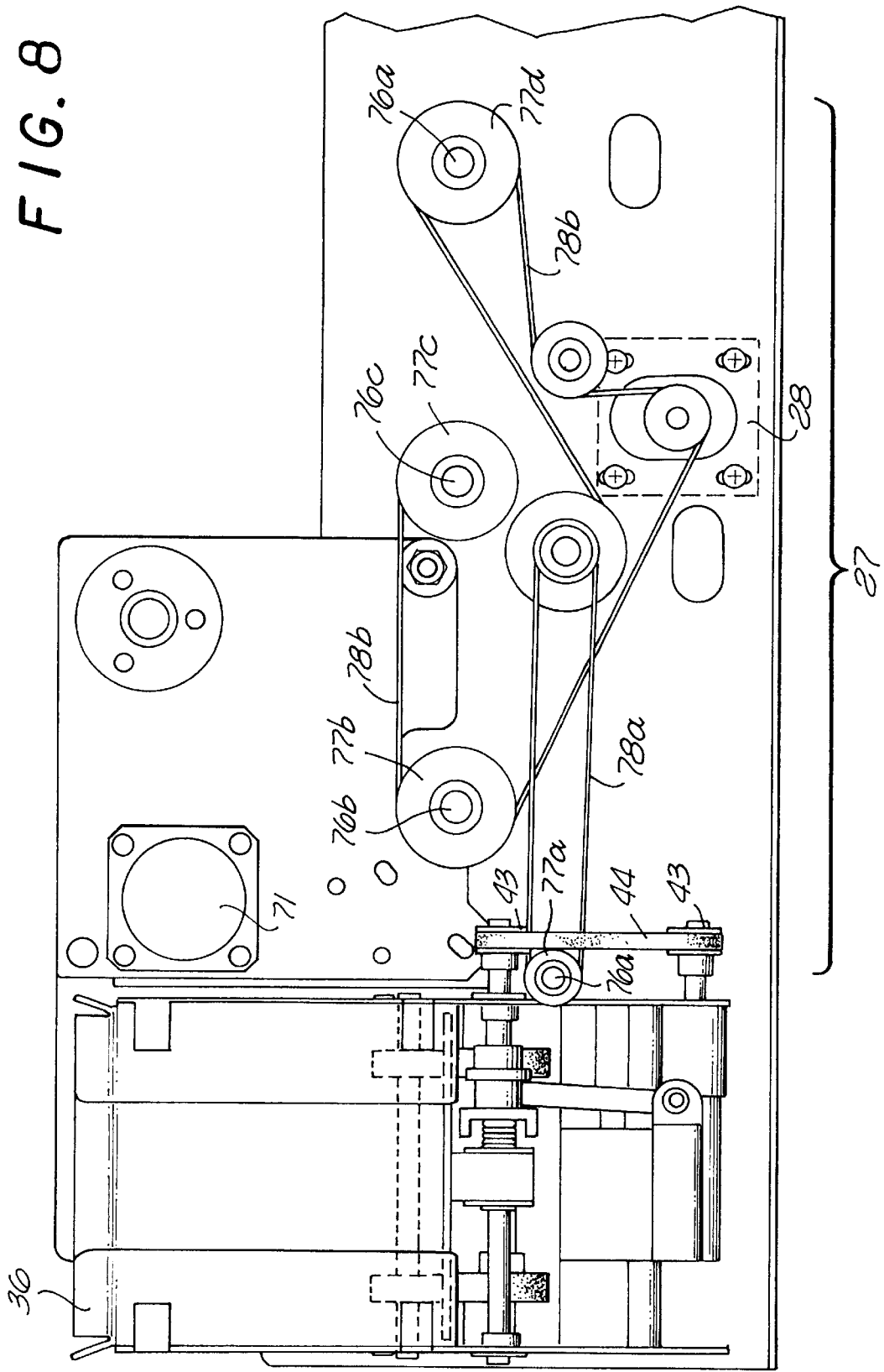

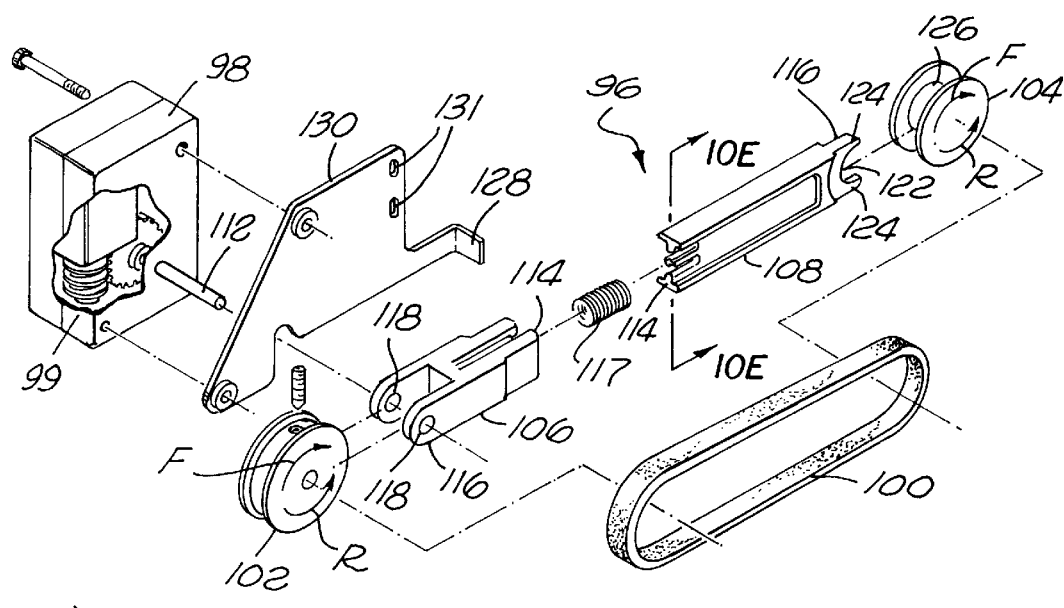
FIG. 10c
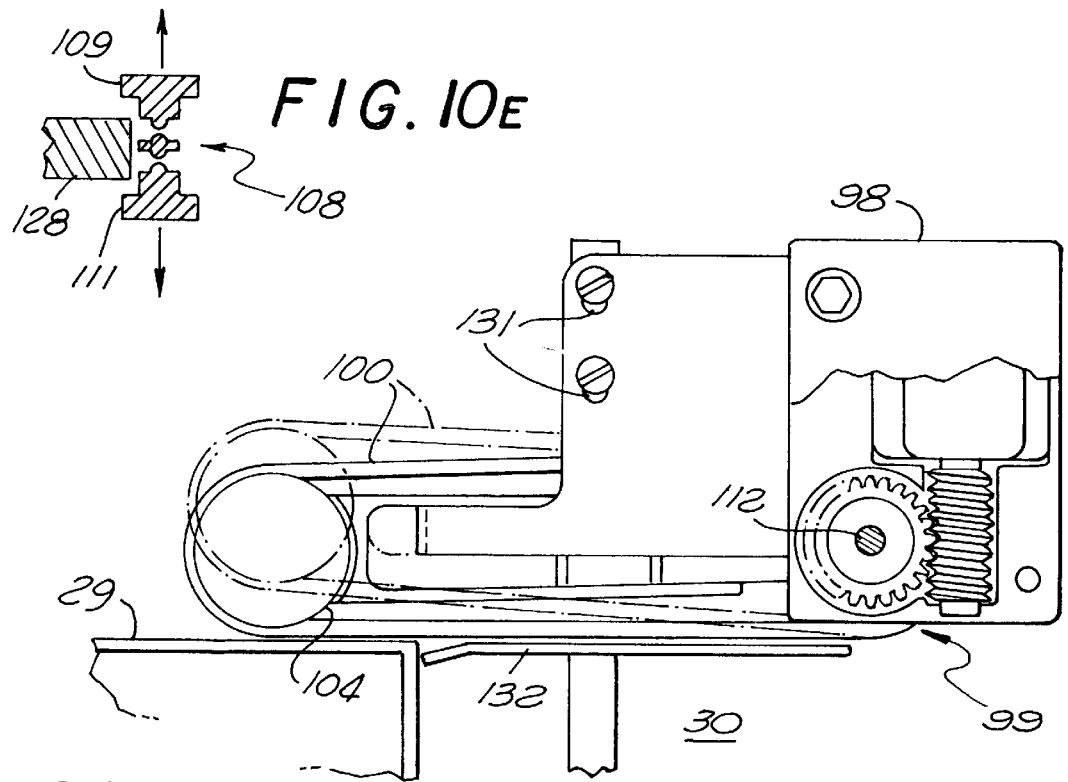
FIG. 10E
FIG. 10D

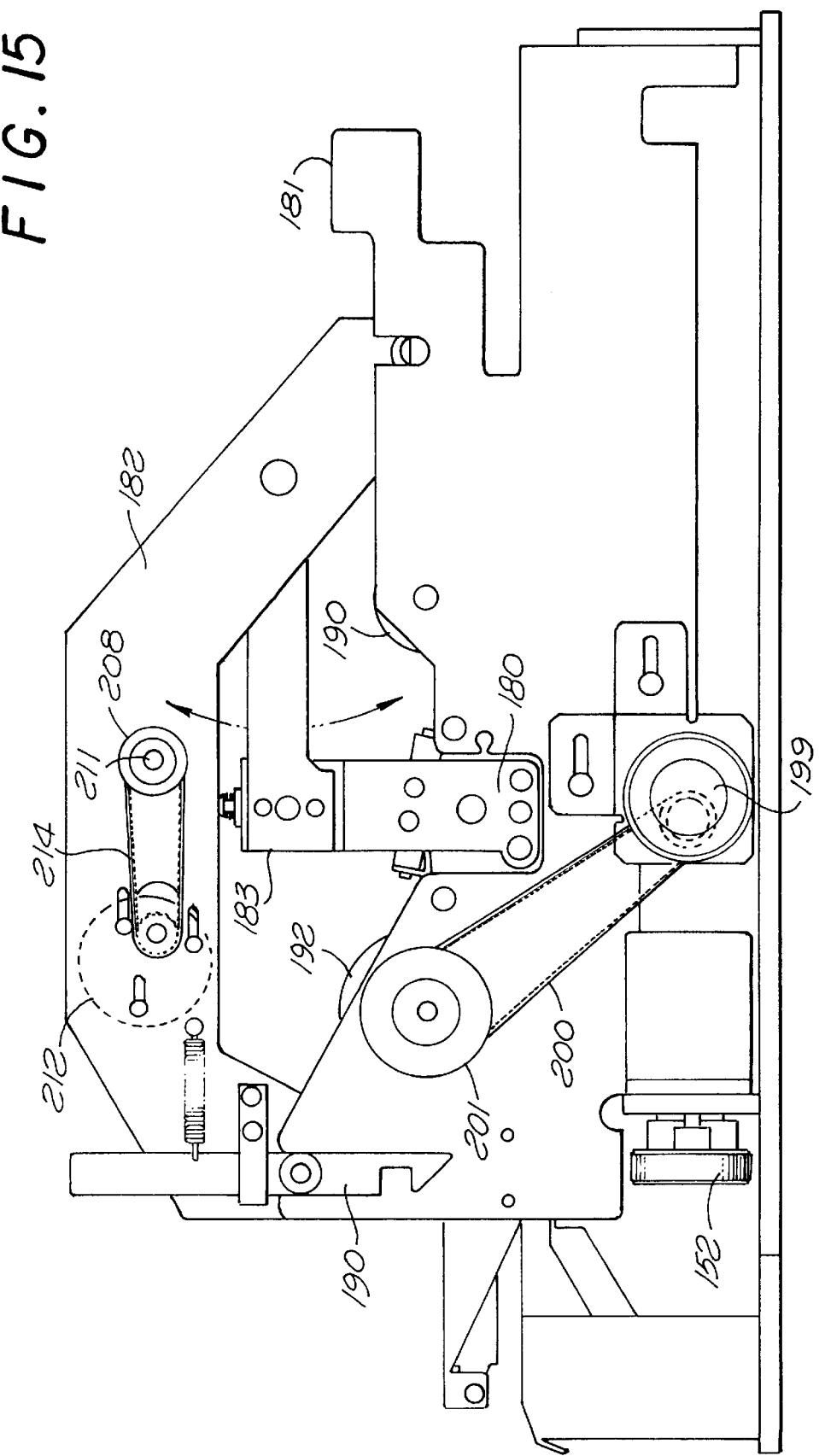

TERMINAL FOR ISSUING AND PROCESSING DATA-BEARING DOCUMENTS

FIELD OF THE INVENTION

This invention relates generally to a system for issuing and processing data-bearing documents and specifically to a system embodied in a terminal for issuing and processing cards or badges bearing human-readable and machine-readable data.

BACKGROUND AND SUMMARY OF THE INVENTION

Identification badges bearing human-readable data, such as photographs, text, graphic designs and logos are known. Such badges have been known to be modified in recent years to become identification badges with electronic key card capabilities for entry onto secured premises. Financial transaction cards bearing machine-readable data, such as magnetic-recordings, integrated circuits, bar codes, or the like, are also known. Commonly referred to as credit cards, debit cards, and "smart" cards, these financial transaction cards are as popular as they are convenient. However, fraudulent misuse of the cards has risen tremendously in recent years.

Accordingly, it has become desirable to incorporate the advantages of identification badges and financial transaction cards for providing cards/badges bearing both human and machine-readable data, that may be used for identification, merchandising and/or marketing. To that end, credit cards bearing a magnetic stripe for storing magnetic recordings may also bear a photo-image pictorially identifying the owners of the cards. Or, an identification badge bearing visual identifying text may also bear a magnetic stripe or a chip to store machine-readable data, such as a premises entry and exit record.

Although such combination ("hybrid") cards have their advantages, their production and issuance may be labor and time intensive. Multiple distinct stages of production and development are typically required, each stage employing distinct equipment and skills. While the issuance and processing of such hybrid cards can be accomplished with conventional means, convenience and ease are still wanting, particularly for, but not limited to, issuance and processing in lesser quantities or frequencies. Accordingly, a need exists for a system which issues and/or processes cards bearing both human-readable and machine-readable data without imposing substantial inconvenience and requiring considerable effort.

Moreover, cards or badges are often exposed to damaging elements such as ultra-violet rays, or dirt and debris that cause the cards or badges to deteriorate. In particular, visual indicia on the surface of the cards become so damaged that replacement of the card is necessary.

Accordingly, there exists a demand for a card issuing and processing system embodied in a terminal which incorporates the distinct processes and equipment to enable cards or badges bearing machine-readable and human-readable data to be issued and processed with substantial ease. It is desired that such a terminal be substantially compact and portable and accommodating of most machine-readable, data-bearing cards, such as magnetic-stripe cards or IC cards. It is further desired that such a terminal adequately prepares the cards for processing, such as by cleaning the surface of the card, and provide a means by which durability of the card surface is increased.

In accordance with the present invention, a card issuing and processing system is embodied in a terminal to accomplish issuing and processing operations on cards bearing both human-readable and machine-readable data, e.g., cards bearing visual indicia, one or more magnetic stripes, and/or an integrated circuit ("chip"). The terminal provides an input hopper mechanism for storing and dispensing new cards, multiple transport mechanisms for transporting the cards, and various processing stations, including a cleaning station, an IC station, a magnetic-write station, a magnetic-read station, and a print station. The cleaning station cleans the surface of the card in preparation for a subsequent operation. The IC station accomplishes electronic data transfer with cards bearing a chip. The magnetic-write and read stations accomplish magnetic data transfer with cards bearing either high and/or low coercivity magnetic media, and the print station accomplishes the application of visual data, including graphic images, text, background designs, or even bar codes. Input/output devices or modems may be used with the terminal as appropriate. A PIN selection device may be provided for the selection of a Personal Identification Number. Moreover, image capturing devices may also be used with the terminal to provide pictorial data such as a photo-image or security logo for the card.

These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows:

FIG. 4 is an exploded view of the terminal and the housing H of the instant invention 1;

FIG. 5A is a partial top plan view of FIG. 2, showing only components of the terminal along a first leg of the path D;

FIG. 8 is a side elevational view of a belt and pulley arrangement for transporting the card along the first leg of the path D;

FIGS. 10B and 10C are exploded perspective views of the lateral positioning mechanism and the lateral transfer mechanism, respectively;

FIGS. 10D and 10E are other side elevation views of the lateral transfer mechanism of FIG. 10A;

FIG. 15 is an opposing side elevation view of FIG. 13A;

DESCRIPTION OF THE ILLUSTRATIVE EMBODIMENT

A detailed illustrative embodiment of the present invention is disclosed herein; however, it is merely representative, recognizing that terminal designs, programming, card handlers, other components, including accessories, may be embodied in a wide variety of forms, some of which may be quite different from those of the disclosed embodiments. Consequently, the specific structural and functional details disclosed herein are merely representative; yet, in that regard, they are deemed to afford the best embodiments for purposes of disclosure and to provide a basis for the claims herein which define the scope of the present invention.

Figure 1A:
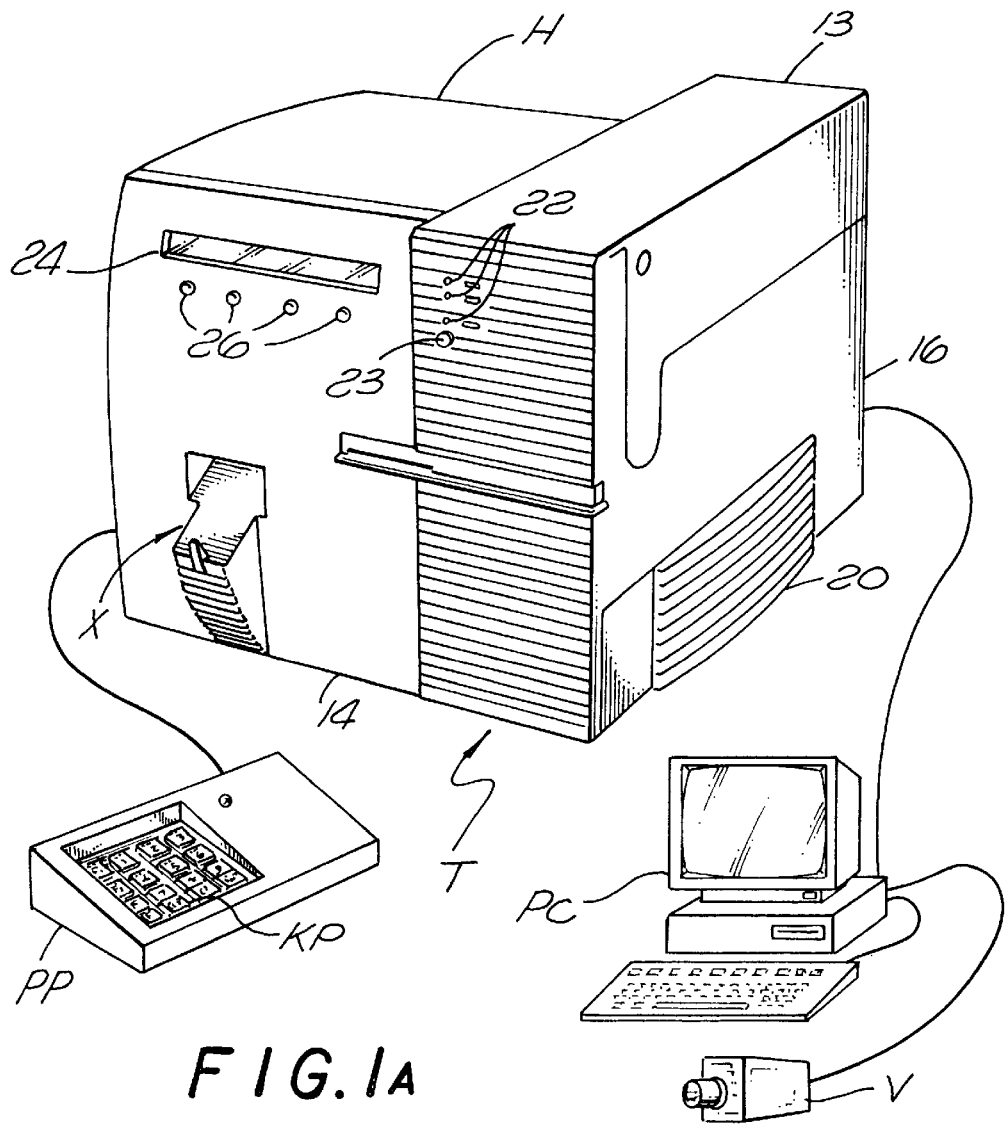
FIG. 1A is a perspective view of a card issuing and processing terminal, with a PIN selection device, a personal computer and a video camera.
Figure 1B:
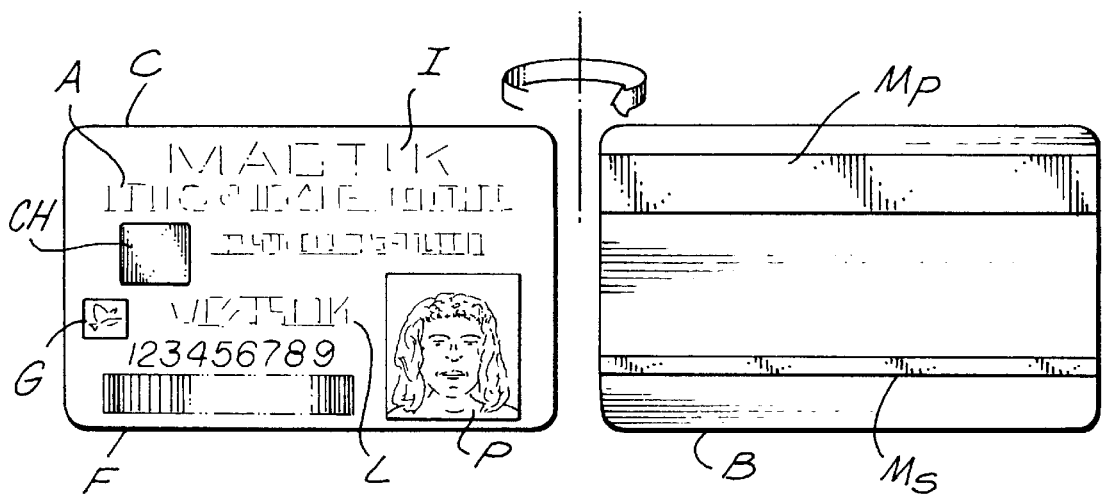
FIG. 1B are perspective views of an issued and processed card in accordance with the present invention.
Figure 2:
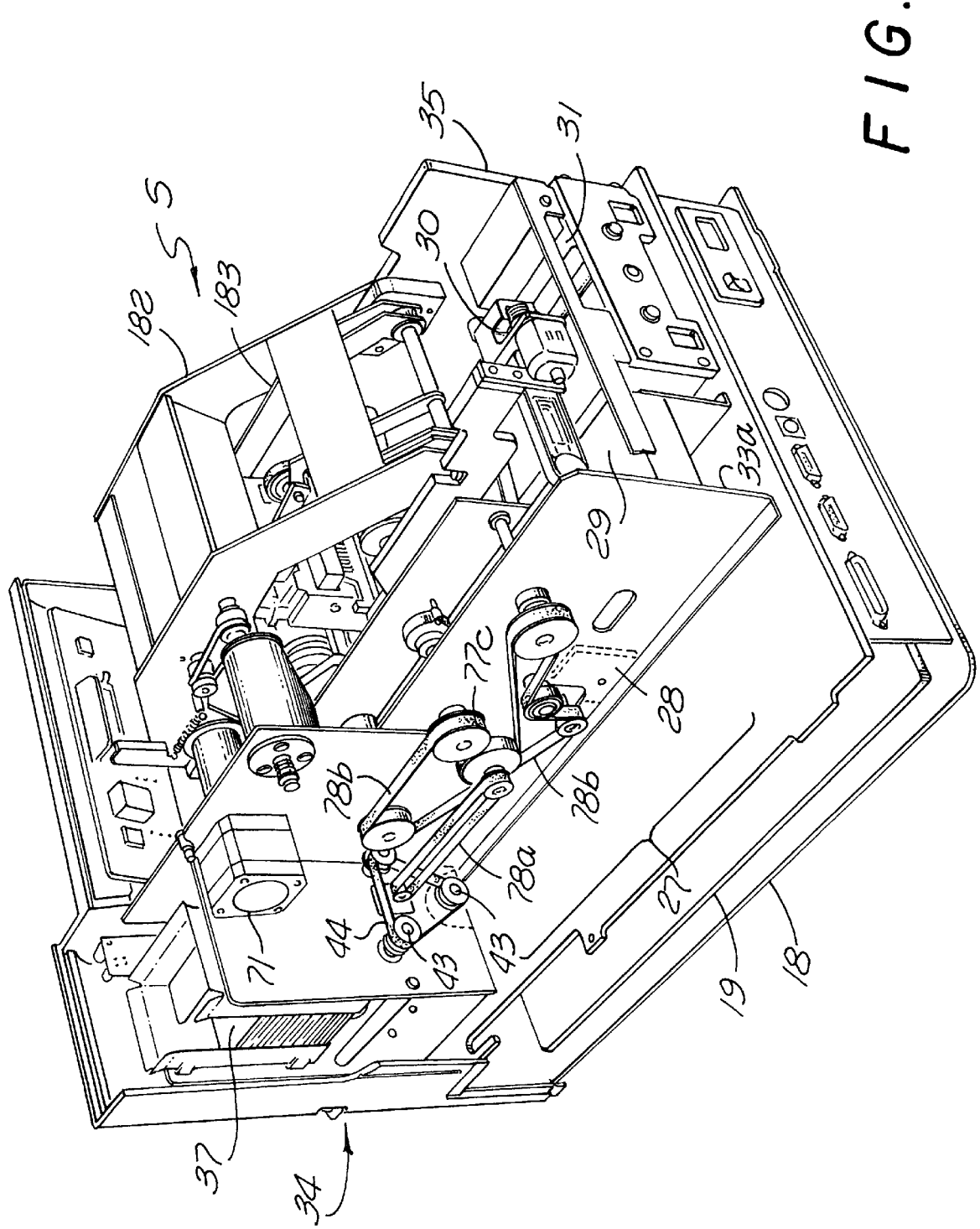
FIG. 2 is a perspective view of the terminal of FIG. 1 with a housing H removed.

Referring to FIGS. 1A, 1B and 2, a system S for issuing and/or processing cards in accordance with the present invention is illustrated. The system S is embodied in a terminal T and issues or processes cards bearing human-readable data and machine-readable data. A card C as issued and processed by the terminal T is shown in FIG. 1B, having a front surface F and a back surface B. The card C is typically formed from a plastic substrate, for example, polyvinyl chloride.

As for the human-readable data, the card C after issuance and/or processing may bear on the front surface F, the name I of the card issuer, the name of person N to whom the card is issued ("recipient"), an account number A, expiration date, etc. The card C may also carry other identifying indicia, and decorative or background indicia, such as advertising, security, or logo indicia. A hologram G may be provided on the front surface F. As another form of personalization, the card may bear a photo-image P of the recipient.

As for machine-readable data, one or more magnetic stripes $M_P$ and $M_S$ may be provided on the back surface B of the card C. Also known as the "ISO stripe," the stripe $M_P$ may consist of a plurality of tracks, whereas the stripe $M_S$, also known as the "value stripe," may consist of a single track only. The magnetic medium of which the stripe $M_P$ is formed may be of either high or low coercivity; however, for the stripe $M_S$ the magnetic medium may be only of high coercivity.

After issuance and/or processing of the card C, the data stored on the stripes $M_P$ and $M_S$ may contain verification information such as access codes, PIN, etc., and financial transaction information requiring updating or revisions, such as debit limits, credit limits and the like. In one embodiment, the stripe $M_S$ may store only debit values, whereas the stripe $M_P$ stores the remaining of such other data. To bear additional machine-readable data, which may consist of further financial data and/or security data, an integrated circuit comprising a chip CH may also be provided on the card C.

Accordingly, the card C may be used for many purposes, including identification, entry to premises, financial transactions, merchandising, marketing, and the like, for which the card may be used as a combination identification badge, credit card, debit card, smart card, etc. As the card has a wide variety of applications, the foregoing is merely a representative list of uses for the card C.

The terminal T is equipped to issue the card C with specified data, or to revise and update data on a pre-existing or previously-issued card. As mentioned, the system S may also include input/output devices, e.g., a personal computer with keyboard PC, to control operations and to provide data for storage on the card C. An image capturing device V, such a video camera, video capture board, or optical scanner, may also be provided in the system S to provide photo-images to the terminal T. The personal computer OC may be used to digitize or modify the captured image for application on the card C. As an alternative to the personal computer, a PCMCIA card 21 (FIG. 4) may be provided for the printing of designs, logos, etc., on the card C.

For issuing and processing bank cards or other financial transaction cards, an alphanumeric keypad may be included in the system S for the provision of PIN data or financial data to the terminal T. To that end, a PIN may be selected by the operator or the recipient through a PIN selection device, or a PINpad PP, which may embody a keypad KN and an algorithm generator AG. The algorithm generator AG may provide multiple algorithms, such as DES, Visa DES and/or Diebold algorithms, for encrypting selected PINs into secure PIN blocks for transmission to the terminal T. The terminal T may have the option of forwarding the encrypted "PIN blocks" to a remote host computer (see FIG. 19), such as by a modem to facilitate communication between the terminal T and a remote host computer. Typically, the terminal T extracts the clear-text PINs and re-encrypts them to generate "offsets" or coded inputs which may be stored on the magnetic stripe $M_P$ as a further deterrence to fraud.

Figure 3:
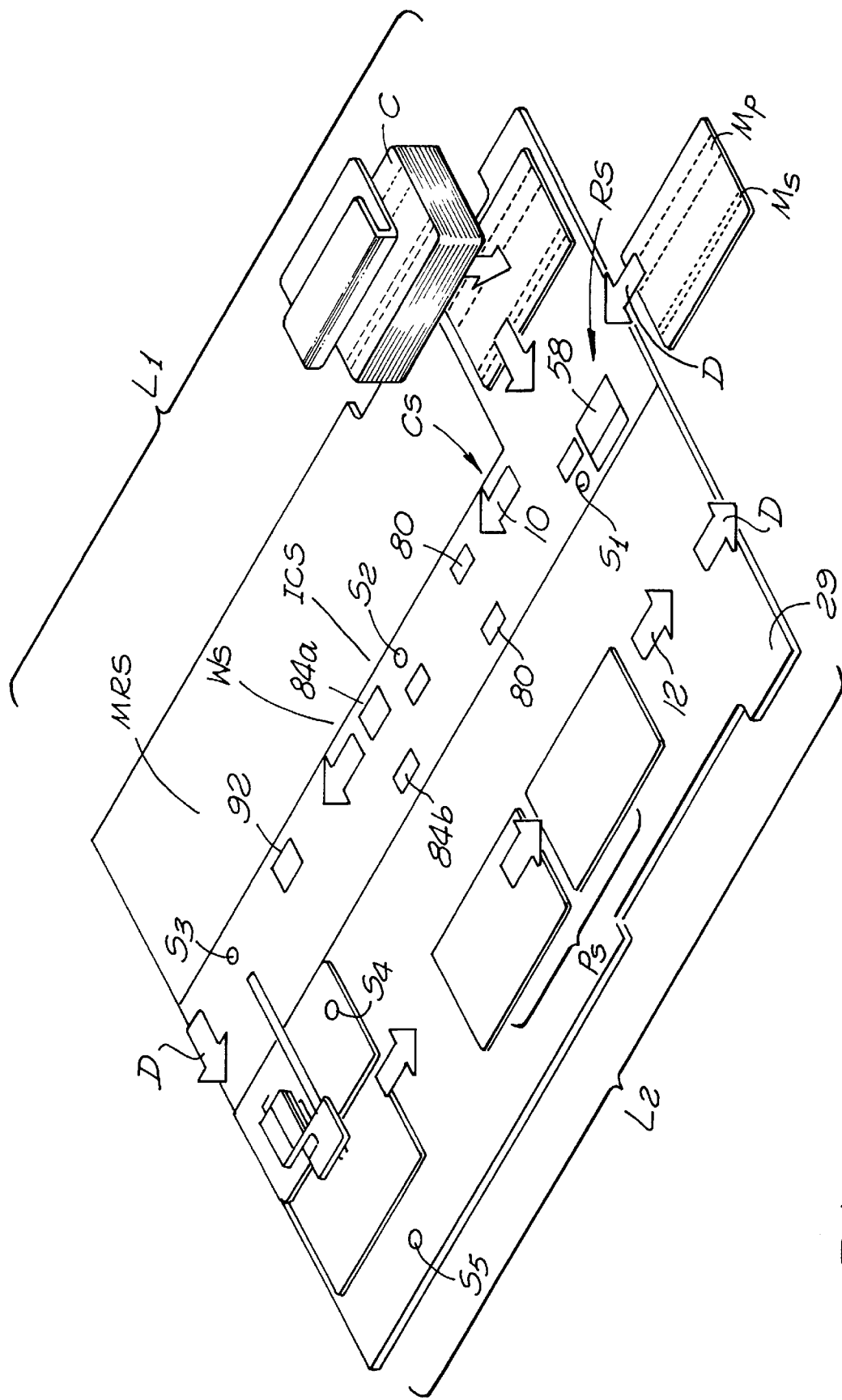
FIG. 3 is a diagram illustrative of a path D defining two opposing legs of transport of the card within the terminal of FIG. 1.

Referring to FIGS. 2 and 3, the terminal T is configured to transport the card C along a path D, defined by two opposite but parallel subpaths, namely, a first (forward) leg $L_1$ along arrow 10 and a second (return) leg $L_2$ along arrow 12. The first leg $L_1$ facilitates various machine-readable data transfer operations with the card C and the second leg $L_2$ facilitates a printing operation on the card C related primarily but not limited to human-readable data.

In one embodiment, along the first leg $L_1$ the terminal T performs a cleaning operation followed first by an IC data-transfer operation, then by a magnetic-write operation and a magnetic read-operation. Along the second leg $L_2$, the terminal T performs a print operation for the application of primarily human-readable data such as photographs, names, account numbers, and the like. The terminal T, however, also contemplates the printing of certain machine-readable data, such as optically-readable bar codes during the print operation. With the two stages of processing, the terminal T may readily dispense and issue new cards, or accept and update preexisting cards, as appropriate.

Referring to FIGS. 1 and 4, the terminal T being somewhat of a cubic configuration is contained in a main housing H having a front section 14, a removable rear section 16 having a hinged top section 13, and removable side vent sections 20. The rear section 16 is configured to extend substantially along three sides of the terminal T, with the top section 13 being hinged thereto to facilitate access into the terminal T for maintenance and the like. As described in further detail below, the rear section 16 and side vent sections 20 are detachable from the front section 14, to further facilitate maintenance of the various stations or modules of the terminal T.

As part of the housing H, two base panels 17 and 18 are also provided to support the terminal T and to house a main circuit board 19 subject to operating software for controlling and coordinating the operations of the various stations in the terminal T. The circuit board 19 may house the PCMCIA card 21 (FIG. 4).

To control the power supply to the terminal T, such as from a wall terminal, a power switch (not shown) is located towards the rear of the terminal T. Towards one side of the front section 14, a toggle switch 23 is provided to control operation of the terminal T on an on-line or off-line basis. Positioned adjacent to the switch 23 are indicators, e.g., three light emitting diodes 22, for indicating, respectively, when the terminal T is receiving power, when an error has occurred and when the unit is ready for operation.

Toward the other side of the front section 14, a display panel 24 is provided for communication with an operator or service personnel of the terminal T. In one embodiment, the display panel 24 provides a liquid crystal display to display messages or prompts to the operator. Adjacent the display panel 24 are multiple soft switches 26 for selecting modes and functions of operations, for example, an "Off Line-Main Menu Mode," a "View Mode," and a "Maintenance Mode." As the switches 26 are activated for the selected operation, the display panel 24 displays the corresponding selected function and related prompts or commands.

The front section 14 also is configured to provide an entry port E and an exit port X. The entry port E enables cards, typically previously issued cards, to be inserted into the terminal T for updating or revision operations. The exit port X discharges processed cards from the terminal T, such cards being either newly-issued cards, or previously-issued cards whose data have been refreshed or updated. The entry and exit ports E and X define a beginning and an end of the bi-directional transport path D of the terminal T (FIG. 3), along which distinct operations are performed by distinct stations within the terminal T.

Figure 5B:
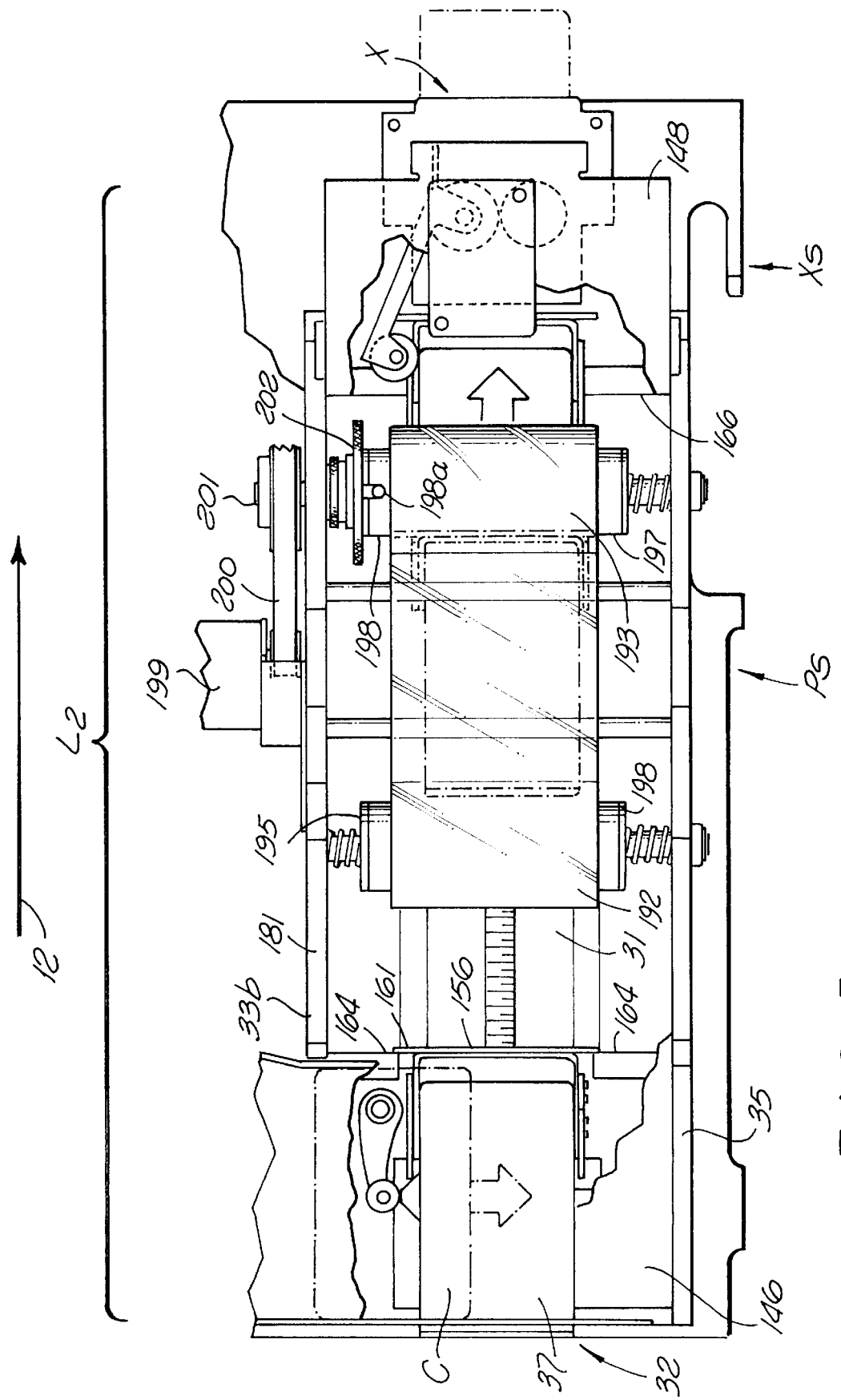
FIG. 5B is a partial top plan view of FIG. 2, showing only components of the terminal along a second leg of the path D.

Referring to FIGS. 5A and 5B, stations (modules or zones) in the terminal T traversed by the transport path D are shown. The path D is substantially U-shaped with the two opposing legs $L_1$ and $L_2$, allowing the terminal T to be compact while enabling each station to be compartmentalized within the terminal T.

The first leg $L_1$ of the path D is defined primarily by a support surface 29, and the second leg $L_2$ is defined primarily by an elongated recessed section 31, both extending the length of the terminal T. The support surface 29 and the recessed section 31 are positioned between the side support walls 33a and 33b. The first leg $L_1$ traverses a receiving station RS, a cleaning station CS, an IC data-transfer station ("smart card station") ICS, a magnetic-write station WS and a magnetic-read station MS. The second (and returning) leg $L_2$ traverses a print station PS and an exit station XS, substantially between the wall 33b and the wall 35.

As mentioned, the terminal T provides transport mechanisms each having distinct capabilities to meet the different needs of the stations for processing the card C. As for the different needs, e.g., the magnetic-write and read stations WS and MRS typically require the card C to move at a more uniform but greater relative speed, whereas the print station PS typically requires the card C to move at a slower relative speed. Also, the print station PS typically requires multiple passes of the card C, whereas the write and read stations WS and MRS each typically require only a single pass. Moreover, the write and read stations WS and MRS typically have greater tolerance for imprecision in the relative positioning of the card C in the stations, whereas the printing station PS typically requires greater precision. Accordingly, the present invention substantially accommodates all these demands by providing the various transport mechanisms to transport the cards C along the path D. In one embodiment, the transport mechanisms include a belt and pulley arrangement 27 driven by a motor 28 (FIG. 2) for the first leg $L_1$ and a carriage assembly 32 (FIG. 5B) for the second leg $L_2$. A lateral transport mechanism 30 (FIG. 2) is provided for transporting the card C from the first leg $L_1$ to the second leg $L_2$.

The various stations and the transport mechanisms of the terminal T having both been identified, the individual components therein are discussed in detail below.

In accordance with the present invention, the terminal T may either issue new cards or update previously-issued cards. To that end, the receiving station RS of the terminal T accommodates both issuing and updating operations by receiving the card C from either an input hopper mechanism 34 or the entry port E.

Illustrated in FIGS. 6A–6D, the input hopper mechanism 34 is typically utilized when the terminal T issues new cards. The input hopper mechanism 34 is positioned adjacent the path D and includes a stacker 36 and a picker 41. The stacker 36 stores a plurality of blank cards, each bearing one or both of the magnetic stripes $M_P$ and $M_S$ on the back surface B, and/or a chip CH on the front surface F. The cards are stacked vertically in the stacker 36, one on top of the other, with their back surfaces B facing down. Being new cards, they typically carry no significant data; that is, no significant data is stored on the magnetic stripes $M_P$ and $M_S$ or the chip CH, and the front surface F displays no significant visual indicia. The stacker 36 is configured to define an opening 38 at the bottom and a slot 40 at the side adjacent the path D for enabling cards to be dispensed to the receiving station RS.

Positioned below the stacker 36, and immediately adjacent the opening 38, the picker 41 comprises primarily a plurality of rollers 42 coupled to the motor 39 by pulleys 43 and a belt 44 (FIG. 6C) to dispense a blank card from the stacker 36 to the transport path D. In particular, a gripper roller 42a first picks a card from the stacker 36 and slides the card toward pairs of upper and lower parallel rollers 42b and 42c positioned between the stacker 36 and the receiving station RS. To facilitate the gripper roller 42a, a raised friction-inducing portion 46 is provided and positioned below the stacker 36 to come into contact with the exposed back surface B of the bottom card C in the stacker 36 when the roller 42a rotates. With the rollers 42a, 42b and 42c all being coupled to the motor 39, the card C is picked from the stacker 36, transported to the receiving station RS and dropped onto the plate 29.

Once the card C is in the receiving station RS, a first sensor $S_1$ positioned in the receiving station RS senses the presence of the card C and transmits a signal to prepare the terminal T to transport the card C down the first leg $L_1$. In one embodiment, the first sensor $S_1$ is but one of several optical sensors $S_1$ provided in the terminal T which utilize the interruption of an optical beam to provide a signal.

Referring still to FIGS. 6A–6D, where the terminal T is selected to update a previously issued card, as opposed to issuing a new card, the entry port E may be utilized. To that end, the entry port E is configured to enable the insertion of a card into the terminal T, typically by an operator. The entry port E is positioned adjacent the receiving station RS such that the inserted card also triggers the sensor $S_1$ to indicate the card's presence in the receiving station RS.

Figure 6A:
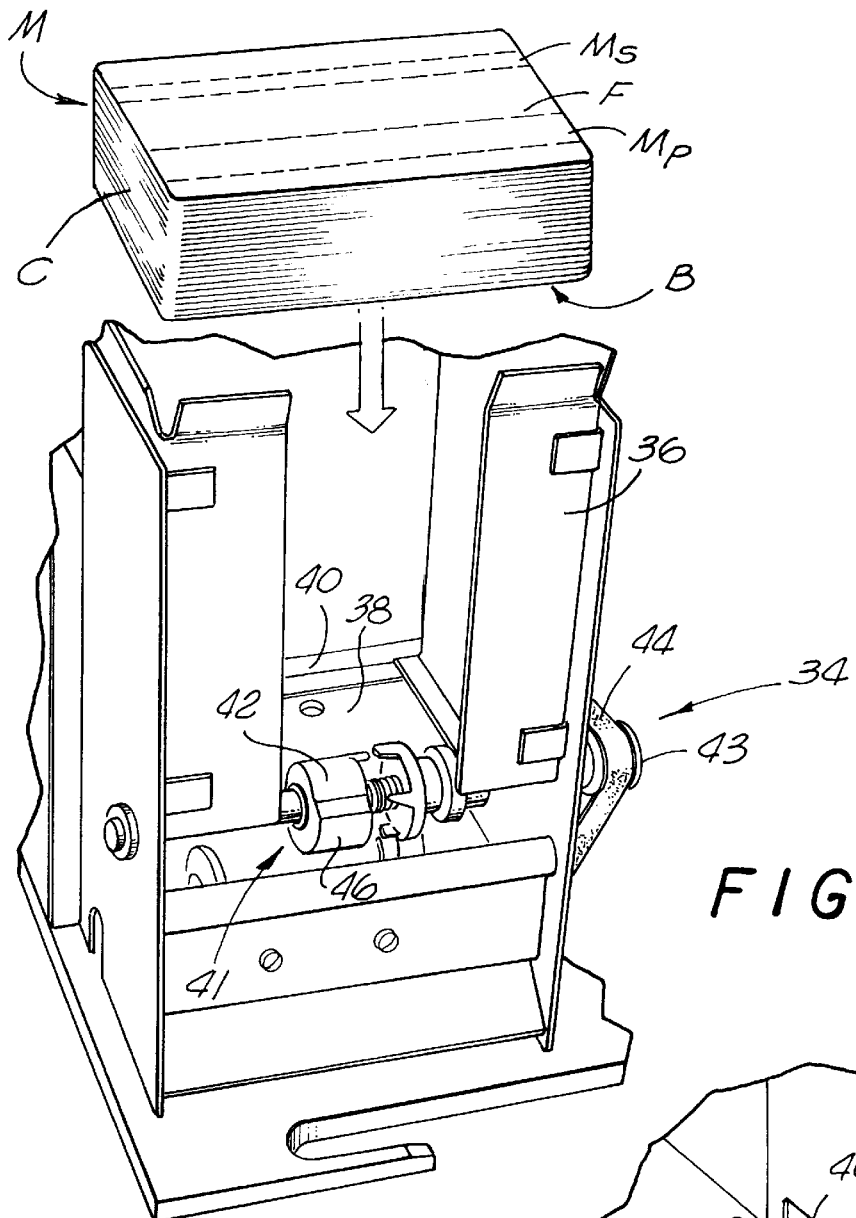
FIGS. 6A and 6B are fragmentary perspective views of an input hopper mechanism of the terminal of the instant invention.
Figure 6B:
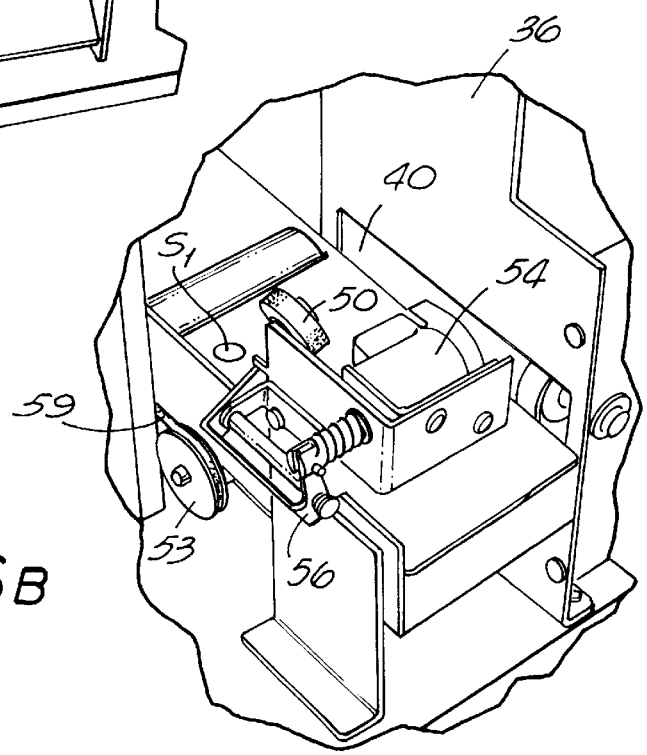
Figure 6C:
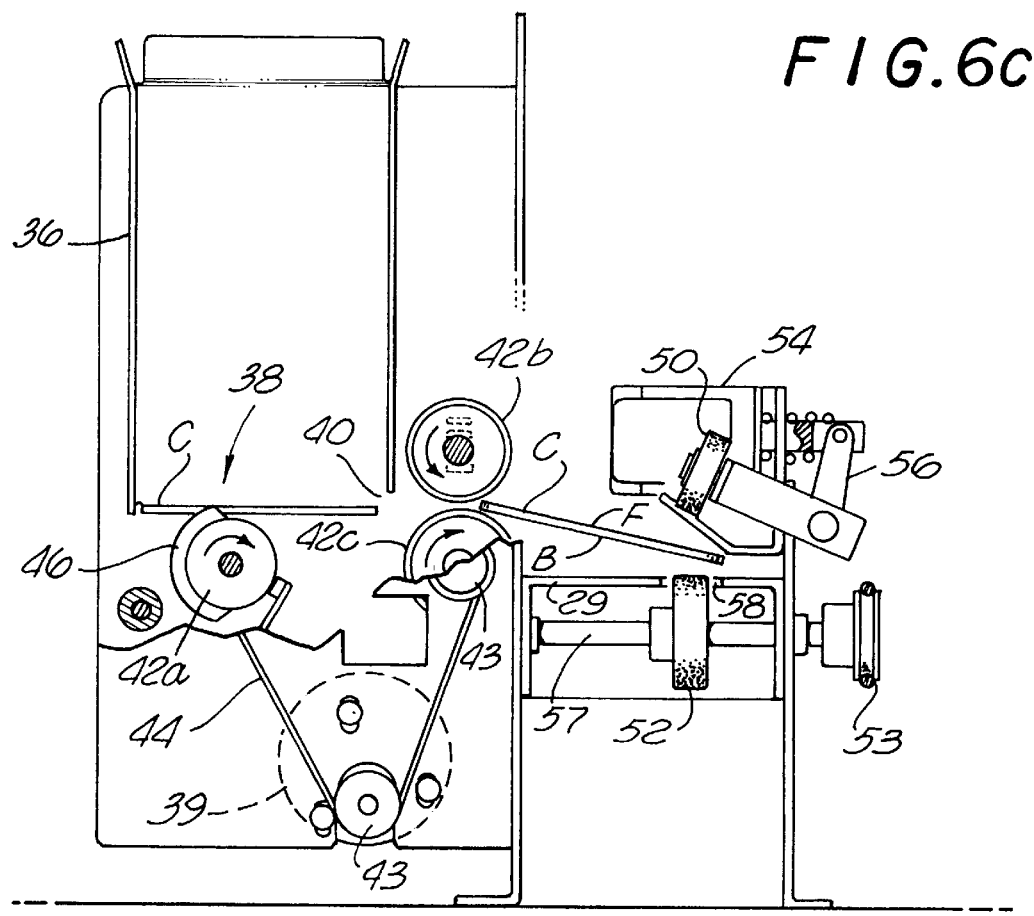
FIGS. 6C and 6D are side elevational views of the input hopper mechanism.
Figure 6D:
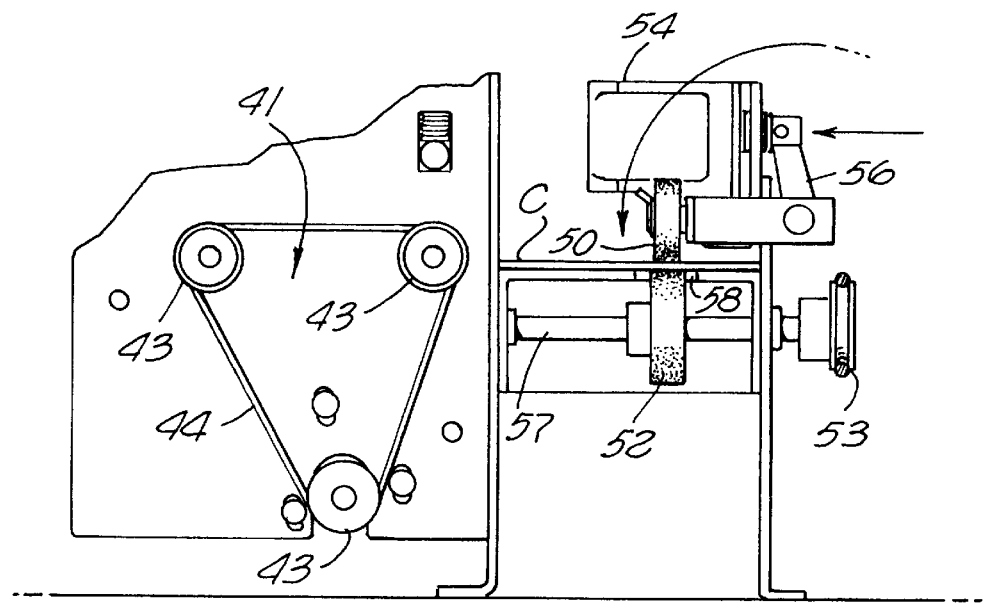

To transport the card (whether inserted or hopper-fed) from the receiving station RS down the first leg $L_1$, rollers 50 and 52 cooperate with each other. In one embodiment, the idle roller 50 is pivotally mounted via arm 56 to a solenoid 54 positioned above the path D which moves the roller 50 between a raised position (FIG. 6C) and a lowered positioned (FIG. 6D). The roller 50 rests in the raised position and is move to the lowered position by the solenoid 54 when triggered by the sensor $S_1$ indicating the presence of the card C in the receiving station RS. When lowered, the roller 50 is placed in contact with the front surface F of the card C, substantially pressing the card C downwardly against the roller 52.

Mounted on a shaft 57 extending transversely below the plate 29, the roller 52 is positioned in an opening 58 defined in the plate 29 such that its upper edge contacts the back surface B of the card C through the opening 58. Unlike the idle roller 50, the roller 52 is driven to rotate by the motor 28 of the arrangement 27 when triggered by the sensor $S_1$. As explained in detail further below, the roller 52 is coupled to the motor 28 by a pulley 53 and a belt 59.

With the card C sandwiched between the rollers 50 and 52, the card C is transported out of the receiving station RS with driven rotation of the roller 52 and down the first leg $L_1$ toward the cleaning station CS.

Figure 7A:
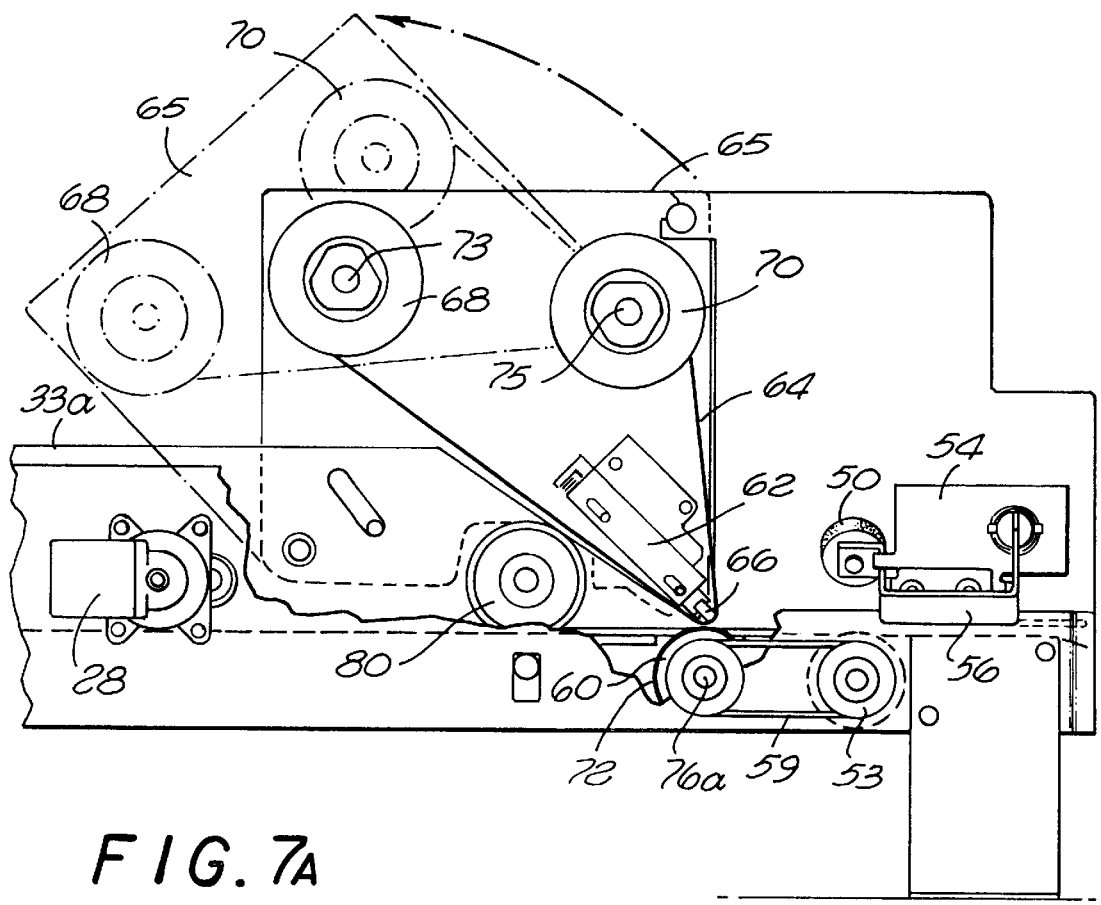
FIGS. 7A and 7B are side elevational views of a cleaning station of the terminal of the instant invention.
Figure 7B:
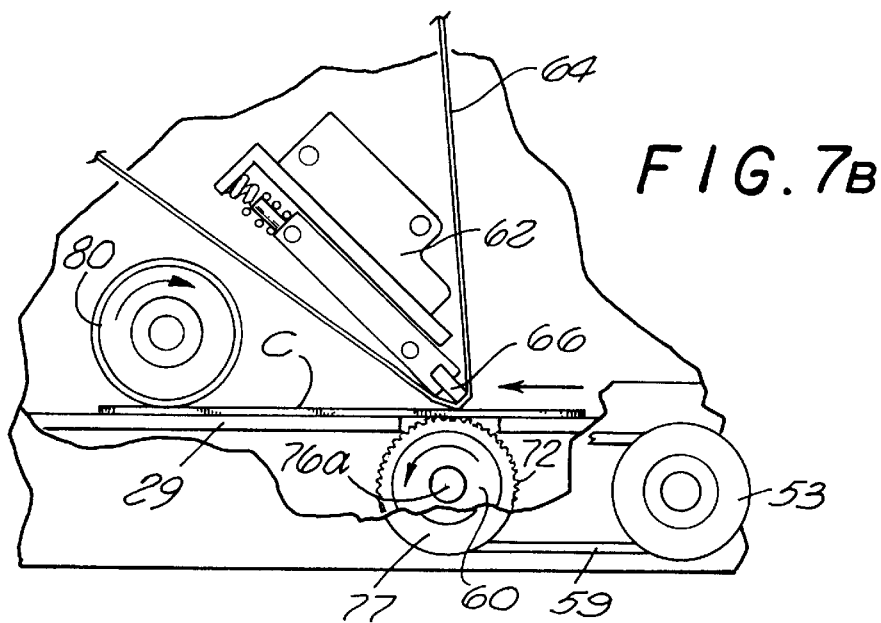
Figure 9:
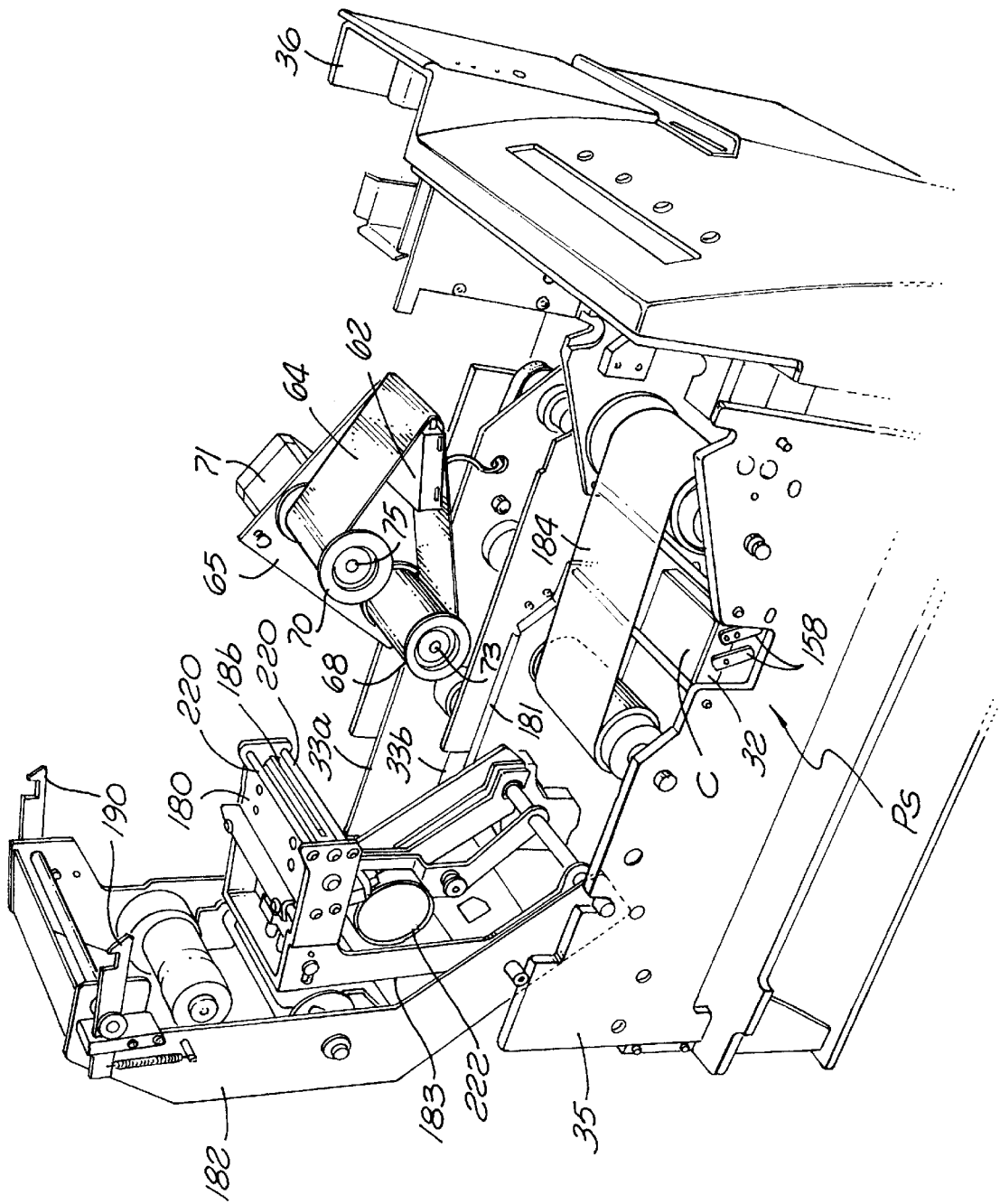
FIG. 9 is another perspective view of the terminal of the instant invention, showing non-operating positions of a cleaning head of the cleaning station and a printer head of a printer station.

FIGS. 7a, 7b and 9 illustrate the cleaning station CS which comprises primarily a feeder roller 60, a cleaning head 62 and a cleaning cloth or ribbon 64 of a selected fabric, e.g., silk or silk-based fabric, wound on rotatable spools 68 and 70. The cloth is composed of white 0.006 crepe de chine silk with a backing of 0.0012 black mylar.

The cleaning head 62 is pivotally mounted on an extended hinged portion 65 of the side wall 33a, to be movable between a raised, loading position (FIG. 9), and a lowered, operating position (FIGS. 7a and 7b). The cleaning head 62 comprises a spring-biased edge 66, preferably constructed of an elastomeric substance, which engages a segment of the cloth 64 extending between the spools 68 and 70. The supply spool 68 mounted on a shaft 73 stores the unused portion of the cloth 64 and the take-up spool 70 mounted on a shaft 75 stores the soiled portion of the cloth 64. The cleaning cloth 64 is advanced from the spool 68 to the take-up spool 70 in predetermined increments by a stepper motor 71 (FIG. 9) also mounted on the extended portion 65 of the side wall 33a, which drives the shaft 75.

Once the cloth 64 is completely soiled, the cloth 64 along with the spools 68 and 70 may be removed from the terminal T and replaced with new spools holding new cloth. To replace the cloth 64, the cleaning head 62 is raised so that the spools 68 and 70 can be removed from the shafts 73 and 75 and be replaced by the new spools. The cleaning head 62 with the new cloth may then be returned to the lowered, operating position.

Best shown in FIGS. 7A and 7B, the feeder roller 60 is situated at the cleaning station CS and cooperates with the cleaning head 62 by pushing the card C under the cleaning head 62. Mounted on a shaft 76a, the feeder roller 60 has a ribbed surface 72 and is positioned in an opening 74 defined in the plate 29 to contact the back surface B of the card C through the opening 74. Moreover, the feeder roller 60 is longitudinally aligned with the edge 66 of the head assembly 62. As best shown in FIG. 8, the feeder roller 60 is coupled to the motor 28 of the arrangement 27 by the outer end of the shaft 76a, a pulley 77a and a belt 78a. Incidentally, as shown in FIGS. 7A and 7B, the inner end of the shaft 76a is coupled to the pulley 53 of the receiving station RS by the belt 59 to drive the components therein, as discussed above.

With the roller 52 of the receiving station RS and the feeder 60 of the cleaning station CS all simultaneously driven by the motor 28, the card C passes from the receiving station RS to the cleaning station CS and between the ribbed surface 72 of the feeder roller 60 and the edge 66 of the head assembly 62. As the card C passes under the edge 66, the cloth 64 effectively wipes the front surface F of the card C, removing dirt and debris to substantially prevent contamination of the interior of the terminal T, particularly the various transport rollers. With the front surface F of the card C cleaned, the card C is prepared for the printing operation as later described.

After the card C passes under the cleaning head 62, it comes into contact with a pair of rollers 80 also coupled to the motor 28 by various components of the arrangement 27, e.g., a shaft 76b, a pulley 77b and a belt 78b (FIG. 8). With the rollers 80 being positioned within one card length of the feeder 60, the card C comes into contact with the rollers 80 before leaving contact with the feeder 60. The rollers 80 thus continue the transport of the card C down the first leg $L_1$, substantially without interruption.

Referring to FIGS. 3 and 5A, the write station WS comprises primarily magnetic write assemblies 82a and 82b (broken lines—FIG. 5A) and two bidirectional rollers 83a and 83b. These rollers are positioned within one card length down the first leg $L_1$ from the rollers 80 and are also coupled to the motor 28 by components of the arrangement 27, e.g., a shaft 76c, a pulley 77c, and the belt 78b (FIG. 8). The rollers 83a and 83b and the write assemblies 82a and 82b are positioned, respectively, above and below openings 84a and 84b configured in the plate 29. With the opening 84a being aligned with the position of the magnetic stripe $M_P$ on the card C, a write head 86a (not shown) of the write assembly 82a is positioned for data transfer with the magnetic stripe $M_P$. Likewise, with the opening 84b being aligned with the position of the magnetic stripe $M_S$ on the card C, a write head 86b (not shown) of the write assembly 82b is positioned for data transfer with the magnetic stripe $M_S$. Accordingly, the write heads 86a and 86b encode the magnetic stripes $M_P$ and $M_S$ as the card C is transported through the write station WS by the rollers 83a and 83b.

For encoding data, activation of the write transducer assemblies 82a and 82 may be triggered by a sensor $S_2$ (FIG. 3) positioned along the first leg $L_1$, between the rollers 80 and the opening 84a. The sensor $S_2$ senses a leading edge of the card C for synchronizing the encoding process on the magnetic stripes. As indicated, the write transducer assemblies 82 may encode data on the magnetic stripes, as appropriate for issuance or update operations. Distinctly, the terminal T enables simultaneously encoding on both the magnetic stripes $M_P$ and $M_S$. Incidentally, the sensor $S_2$ effectively sensing the departure of the card C from the cleaning station CS may also trigger the motor 71 of the cleaning station CS to advance the cleaning cloth 64.

To ensure that the card C is properly aligned with write heads 86a and 86b, the feeder roller 60 and/or the rollers 80 may be slightly angularly offset or canted by an angle α from an axis A perpendicular to the first leg $L_1$ (angle α shown grossly enlarged in FIG. 5A). The angle a may be less than 2.0 degrees, and in one embodiment, the angle α may be substantially 0.5 degrees. This angular offset ensures that an adjacent edge of the card C abuts the wall 33a as the card C is transported through the stations of the first leg $L_1$, especially the write station WS.

Referring still to FIGS. 3 and 5A, the card C is transported past the write station WS to the read station MRS to come into contact with a second bi-directional roller 88. This roller 88 is positioned within one card length down the first leg $L_1$ from the roller 83a. The read station MRS comprises primarily a magnetic read assembly 90 (broken lines—FIG. 5A) and the bidirectional roller 88. The roller 88 is also driven by the motor 28 and coupled thereto by components of the arrangement 27, e.g., a shaft 76d, a pulley 77d and the belt 78b (FIG. 8). The roller 88 and the read assembly 90 are positioned, respectively, above and below an opening 92 configured in the plate 29. The opening 92 being aligned with the magnetic stripe $M_P$ of the card C, a read head 94 (not shown) of the read assembly 90 is positioned to read data off the magnetic stripe $M_P$. Using the signal from the sensor S2, the read head 94 reads and/or verifies data recorded on the magnetic stripe $M_P$ as the card C is transported through the read station MRS by roller 88.

The read operation among other purposes typically serves to verify the data encoded on the stripe $M_P$ during the write operation. As provided in the present system S, if the read operation indicates errors or the like in the data written on the stripe $M_P$, the rollers 83 and 88 can be motivated by the motor 28 to transport the card C for another pass through the write station WS for a rewrite operation. Thereafter, the card C can pass through the read station MRS for a reread operation. This process may be repeated as many times as appropriate for the system S to rewrite and reread data on the magnetic stripe $M_P$ of the card C. With the completion of the read operation, the card C is transported out of the read station MRS, and arrives at an end 89 of the first leg $L_1$ of the path D.

Where the card C bears a chip CH, the present invention also provides for a smart card station ICS along the first leg $L_1$ to communicate with the chip CH. The station ICS may be positioned between the cleaning station CS and the write station WS (FIG. 3). The station ICS may utilize the rollers 80 of the cleaning station CS to draw the card C into the smart card station ICS. To that end, the sensor $S_2$ or another sensor may be provided for signalling the motor 28 to temporarily cease transport of the card C when it arrives at the station ICS. While the card C is stationary in the station ICS, contact with the chip CH may be accomplished by leads 81a mounted on flexible cables in the station ICS (FIG. 5A). A solenoid 81 may be provided to move the leads into contact with the chip CH. Data such as an image of the magnetic stripes on the card C may thus be read off or written on the chip CH.

Referring to FIGS. 10A–10D, the lateral transfer mechanism 30 transfers the card C from the first leg $L_1$ to the second leg of the path D. As mentioned, the path D is substantially U-shaped, the legs $L_1$ and $L_2$ being parallel but defining opposite directions of transport, rendering the terminal T substantially compact and portable.

The transfer mechanism 30 is disposed between the first leg $L_1$ and the second leg $L_2$ and comprises primarily a belt and pulley structure 96 driven by a gear box 98. The gear box 98 houses a worm gear arrangement 99 driving a shaft 112. Waiting for the arrival of the card C, the structure 96 in an upper position is positioned above the card C at the end 89 of the first leg $L_1$ and is movable between this upper position (broken lines—FIG. 10D) and a lower position (solid lines). The upper position allows the card C to arrive at the end 89 unimpeded; the lower position allows the structure 96 to move the card C. When the gear box 98 is triggered into forward operation by a sensor $S_3$ indicating that the card C is at the end 89, the structure 96 is moved to the lower position. The card C having completed the first leg $L_1$, The sensor $S_3$ also triggers the motor 28 of the belt and pulley arrangement 27 to cease.

The structure 96 includes a drive belt 100 coupling a driver pulley 102 and a driven pulley 104. The driver pulley 102 is driven by the shaft 112 extending from the gear box 98, and the pulleys 102 and 104 are separated by an inner arm 106 and an outer arm 108. The arms 106 and 108 are longitudinally aligned; however, they are axially offset from each other by 90 degrees. While adjacent ends 114 of the arms 106 and 108 are configured to interlock with each other, distal ends 116 of the arms 106 and 108 are distinctly configured to engaged the shaft 112 and the driven pulley 104, respectively. Moreover, referring to FIG. 10E, the significance of which is explained below, the outer arm 108 is configured such that its cross-section provides an upper flange 109 and a lower flange 111, each of which may abut a stop 128 extending from a mounting bracket 130 as the structure 96 moves between the upper and lower positions.

In one embodiment, the distal end 116 of the inner arm 106 has a clevis portion 118 straddling the driver pulley 102 to pivotally mount the inner arm 106 to the shaft 112. In contrast, the distal end 116 of the outer arm 108 has a recessed portion 122 defining two prongs 124, which substantially engages a sheave 126 of the driven pulley 104. A belt-tensioning spring 117 separates the arms 106 and 108 to maintain tension on the belt 110.

Once triggered, the gear box 98 drives the shaft 112 in a forward direction F (clockwise—FIG. 10C). The shaft 112 in turn drives the driver pulley 102 to move the belt 100 and the driven pulley 104 in the forward direction. However, due to a frictional drag between the sheave 126 of the driven pulley 104 and the recessed portion 122 of the outer arm 108, the driven pulley 104 substantially resists rotation about its axis in the forward direction. Without relative movement between the belt 100 and the driven pulley 104, the whole structure 96 rotates with the driver pulley 102 about the shaft 112 in the forward direction from the upper position to the lower position.

The structure 96 rotates in the forward direction until the upper flange 109 of the outer arm 108 abuts the stop 128. At this point, the belt 100 is in contact with the card C at the end 89, causing the moment about the axis of rotation of the driven pulley 104 to overcome the frictional drag and the belt 100 begins to move relative to the pulleys 102 and 104, drawing the card C from the first leg $L_1$ to the carriage assembly 32. The card C is thus drawn across the surface 29 and off a connecting surface 132 (FIG. 10D) onto the second leg $L_2$.

Vertical slots 131 provided in the mounting bracket 130 enables the lateral transfer mechanism 30 to be mounted on an extension 33c of the wall 33b, at a selected height above the plates 29 and 132. Accordingly, cards of different thicknesses may be readily accommodated for transport by the lateral transfer mechanism 30.

A sensor $S_4$ is located adjacent the lateral transfer mechanism 30 to detect the card C passing from the first leg $L_1$ to the second leg $L_2$. Upon such detection, the sensor $S_4$ triggers the gear box 98 to drive the shaft 112 in the reverse direction (counterclockwise—FIG. 10C). The structure 96 then moves through a similar but reverse operation of that described above, returning to the upper position as the lower flange 111 abuts the stop 128 (FIG. 10E). By limiting the movement of the structure 96 with the stop 128, the belt 100 is subjected to substantially less wear and tear.

Referring to FIGS. 5B and 11A–11C, the carriage assembly 32 transports the card C down the second leg $L_2$, through the print station PS between a loading zone 146 and an unloading zone 148. A carriage body 37 of the carriage assembly 32 travels the length of the second leg $L_2$, supported on a lead screw 150 and two longitudinal shafts 152. The lead screw 150 is driven by a stepper motor 153 coupled by a belt 151 (FIG. 12) to advance the carriage body 37 along the leg $L_2$. The carriage assembly 32 transports the card C in the forward and reverse directions for enabling multiple passes through the print station PS.

Figure 11A:
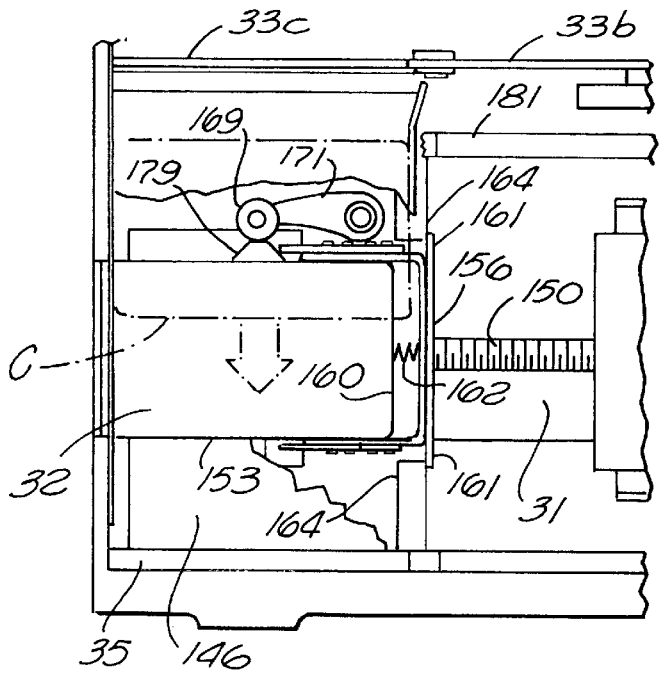
FIGS. 11A and 11B are top plan views of a carriage in accordance with the present invention.
Figure 11B:
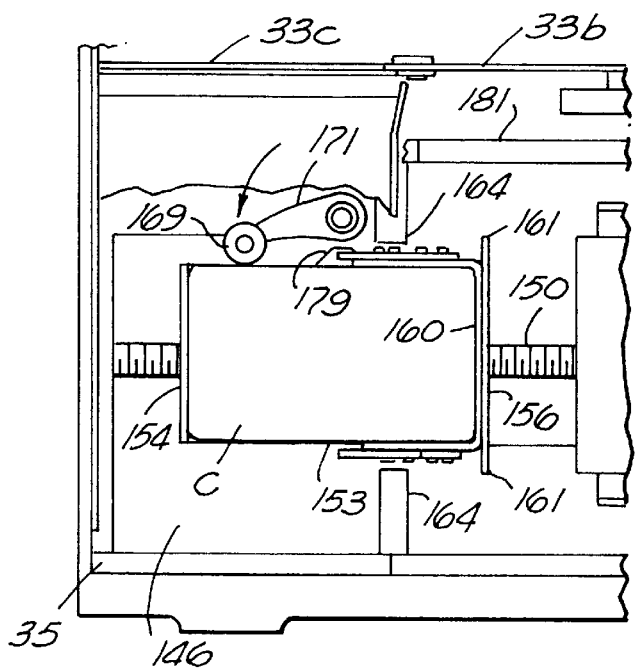
Figure 11C:
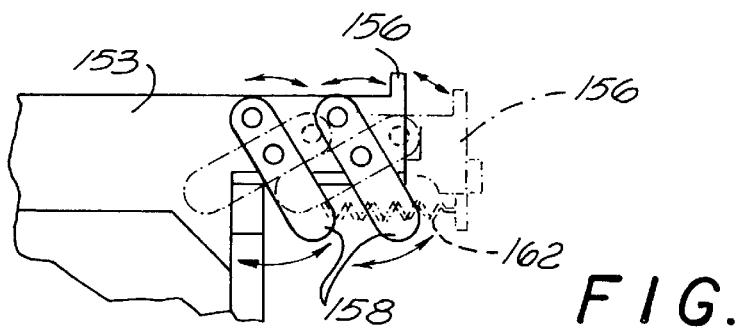
FIG. 11C is a fragmentary side elevational view of the carriage of FIGS. 11A and 11B.

As shown in FIGS. 11A–11C, the carriage body 37 has a main planar portion 153 equipped with a rear alignment flange 154 and a front alignment bracket 156. The front alignment bracket 156 is somewhat U-shaped to extend partially around the main planar portion 153 and is pivotally mounted to the planar portion 153 by two pairs of parallel arms 158 and 158. As shown clearly in FIG. 11C, the arms 158 enable the front bracket 156 to move in a substantially arcuate movement between an open, lowered position (broken lines) and a closed, raised position (solid lines). Referring to FIG. 11A only, the front bracket 156 in the closed position abuts a front edge 160 of the main planar portion 153 and may sit slightly above the planar portion 153. In the open position, the front bracket 156 is separated from the front edge 160, and due to the parallel-pivoting action of the arms 158 the front bracket 156 may be relatively lower than or at least level with the planar portion 153.

The front bracket 156 is biased toward the closed position by a spring 162 extending between the front bracket 156 and the planar portion 153. With the planar portion 153 having dimensions comparable to those of the card C, the card C fits snugly on the carriage body 37 when the front bracket 156 is closed. Accordingly, slight longitudinal, as well as lateral, movements of the card C in the carriage body 37 are substantially eliminated during transport for optimizing printing results.

To open the front bracket 156, fixedly mounted pins 164 are strategically placed along the second leg $L_2$. Shown in FIG. 13A, the pins 164 are positioned at opposing locations along the leg $L_2$ to engage the tab 161 on the front bracket 156 prior to the carriage body 37 fully entering the loading zone 146. While the carriage body 37 moves into the loading zone 146, the tabs 161 are held stationary by the pins 164, forcing the front bracket 156 to open against the bias of the spring 162. Accordingly, the front bracket 156 is held open while the carriage body 37 is situated in the loading zone 146. Accordingly, the carriage body 37 waits for the card C to be deposited by the lateral transfer mechanism 30 as described above.

Figure 10A:
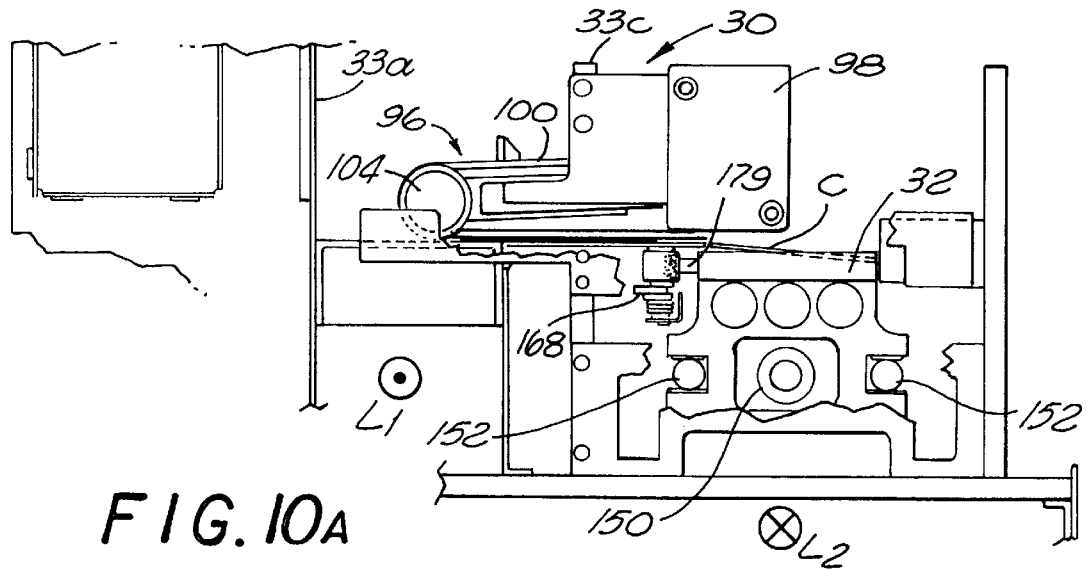
FIG. 10A is a side elevational view of a lateral transfer mechanism and a lateral positioning mechanism.
Figure 10B:
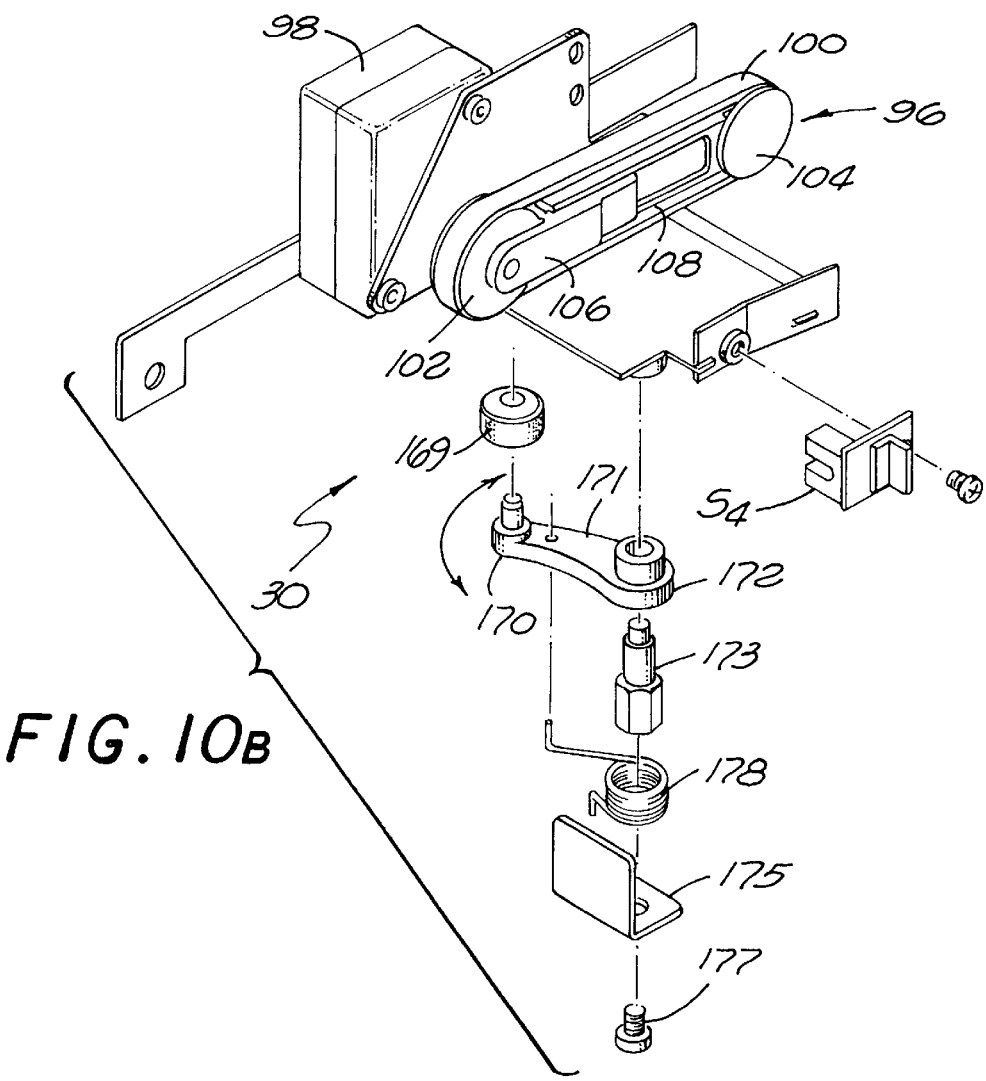

As the sensor $S_4$ detects the transport of the card C from the first leg $L_1$ to the second leg $L_2$, it sends a signals for triggering a delayed activation of the motor 153 which drives the carriage body 37 from the loading zone 146. Prior to the carriage body 37 departing from the loading zone 146, a lateral positioning mechanism 168 is provided and employed to ensure lateral alignment between the card C and the main planar portion 153 of the carriage body 37. As shown in FIGS. 10A and 10B, the lateral positioning mechanism 168 comprises a roller 169 mounted on one end 170 of an arm 171 whose other end 172 is mounted on a stud 173. The stud 173 is fixedly mounted to the terminal T, adjacent the carriage body 37, by a bracket 175 and a screw 177.

Referring also to FIGS. 11A and 11B, the arm 171 is mechanically enabled to move in a lateral sweep motion between an open position, and a closed position biased by a spring 178. To open the arm 171 against the spring 178, the carriage body 37 is configured to provide a cam 179 on the side adjacent the mechanism 168, such that when the carriage body 37 is in the loading zone 146 the cam 179 engages the roller 169 and opens the arm 171 against the bias of the spring 178. As such, the card C transported by the lateral transfer mechanism 30 may drop into the carriage body 37 without obstruction by the arm 171 or the roller 169.

Once the carriage body 37 departs from the loading zone 146, the cam 179 is moved past the roller 169 and the arm 171 closes under the bias of the spring 169, bringing the roller 169 in contact with an adjacent edge of the card C. The roller 169 under the force of the spring 178 then guides the card C into alignment with the carriage body 37.

Activated by the sensor $S_4$, the motor 153 drives the lead screw 150 to advance the carriage body 37 down the second leg $L_2$. As the carriage body 37 leaves the loading zone 146, the front bracket 156 closes under the bias of the spring 162 as the tabs 161 move past the pins 164. With the front bracket 156 closed, the card C is substantially secured to the carriage body 37, thus prepared to undergo the print operation at the print station PS. A sensor $S_5$ (FIG. 3) detects the departure of the carriage body 37 from the loading zone 146 to trigger the lateral transfer mechanism 30 to return the structure 96 to the upper position.

Referring to FIGS. 9, 12 and 13, the print station PS comprises primarily a print head 180 pivotally mounted by a support bracket 183 to a head assembly bracket 182, which in turn is pivotally mounted on the supporting side wall 35 and a mid-wall 181 in the terminal T. While the support bracket 183 enables the print head 180 to be moveable between an engaged position (lowered) and a disengaged position (raised), the head assembly bracket 182 enables the print head 180 and the support 183 to move between an operating position (closed) (FIG. 13—solid lines) and a loading position (open) (FIG. 9). The open position facilitates primarily maintenance and/or repair of the print station PS, including the loading and unloading of the ink ribbon 184. A latch 190 is provided to releasably lock the head assembly bracket 182 in the closed position.

The print head 180 comprises a thermal print head for use with a heat sensitive ink ribbon 184. The thermal print head 180 contains a plurality of print elements 186 which can be selectively heated by the passage of electric current therethrough. The ink ribbon 184 may be multi-colored in that it provides a series of differently-colored panels 188 (FIG. 12) for monochromatic or color printing on the card C. The series of panels may comprise a yellow panel, a magenta panel, and a cyan panel. An opaque strip 189 may be positioned between the cyan and the yellow panels to delineate the series by triggering a sensor $S_6$ (not shown) of the print station PS positioned adjacent the print head 180. Most colors of the visible spectrum can be accomplished with different combinations of these three color panels, in particular, black can be accomplished as a combination of all of the three colors. As indicated earlier, the color ink panels 188 may be used in the printing of human readable data such as text, images, logos, designs and the like, on the front surface F of the card C.

Moreover, the ink ribbon 184 may also provide a carbon panel after the cyan panel for the printing of machine-readable data such as bar codes on the front surface F of the card C, as earlier mentioned. Furthermore, the ink ribbon 184 may also provide a clear overcoat or overlay panel for the application of a protective layer over the human-readable data and/or the bar codes to reduce exposure of the front surface F of the card to UV rays or other damaging elements. Accordingly, application of the bar codes and the protective layer may follow the printing of the human readable data. The ink ribbon 184 may provide multiple overcoat or overlay panels which may be sequentially applied to one card for increasing the durability of the printed indicia.

Where the card C undergoes multiple passes under the print station PS, relative movement between the card C and the carriage body 37 is to be avoided to reduce the possibility of blurring or other adverse effects. The carriage assembly 32 is thus well suited for transporting the card C through the print station PS because the lead screw 150 readily enables direction reversals and the closed front bracket 156 substantially secures the card C on the carriage body 37. Moreover, with the thermal head 180 being fixed, movement of the carriage body 37 can be accurately controlled by the lead screw 150. As described in detail below, mechanisms are provided to synchronize the movement of the carriage body 37 and the advancement of the ink ribbon 184 to facilitate the printing operation.

Figures 12A, 12B:
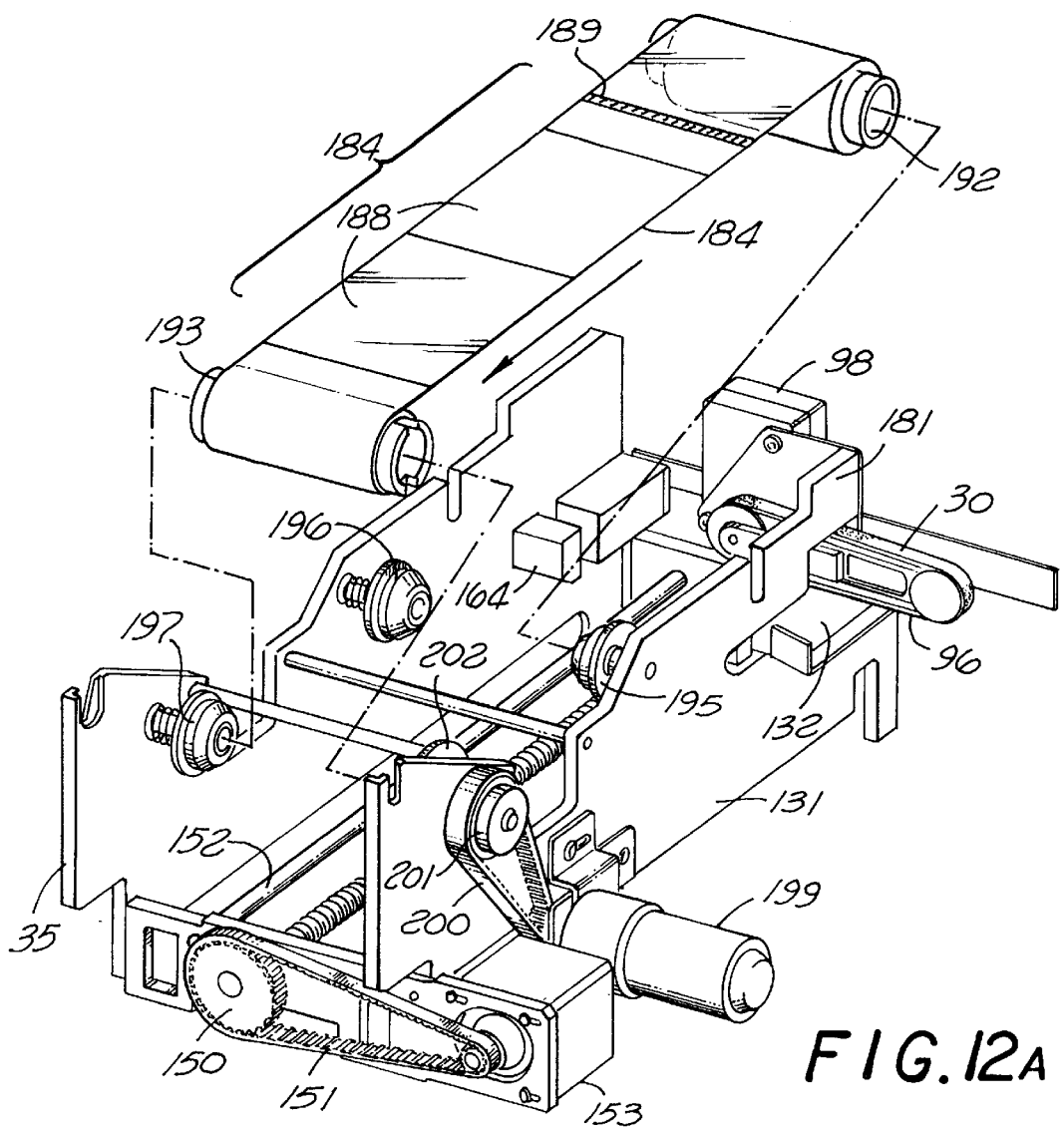
FIG. 12A is a partially exploded view of the second leg of the path D, in particular, an ink ribbon of the print station and carriage support mechanisms of the carriage.
FIG. 12B is a side elevational view of a take-up spool of the ink ribbon, showing a clutch mechanism.

Preliminarily referring to FIG. 12A, the ink ribbon 184 is wound on a supply spool 192 and a take-up spool 193 which spools in turn are mounted on spring-loaded knob or plug members 195, 196, 197 and 198. Whereas the knob members 195, 196 and 197 are idle, the knob member 198 is driven by a motor 199 and coupled thereto by a belt 200 and a pulley 201 for advancing the ink ribbon 184. The knob members 195 and 198 may provide pins 198*a* to interlock with receiving configurations on the spools 192 and 193.

Because the knob member 198 is driven by the motor 199, a slip clutch mechanism 202 may be provided between the knob member 198 and the pulley 201 to facilitate the printing operation, such as to maintain tension on the ink ribbon 184 during printing. A segment 204 of the ink ribbon 184 extends between the rolls 192 and 194 for contact with the thermal print head 180. In the operating position (FIG. 13) the print head 180 directs the segment 204 of the ink ribbon 184 downwardly toward the card C carried on the carriage body 37. During the print operation, the terminal T coordinates the motor 199 driving the take-up roll 192 with the motor 153 driving the carriage body 37. As the thermal print head 180 is printing, the ink ribbon 184 and the carriage body 37 are moving at the same speed, e.g., 0.5 inch per second.

Referring to FIGS. 13A–13B, 14A–14B and 15, actual printing requires both the print head 180 to be physically engaged, and the print elements 186 to be energized while the print head 180 is so engaged. Accordingly, as part of the print station PS, an eccentric cam 208 and an indicator 210 are provided within the head assembly bracket 182.

The eccentric cam 208 essentially pivots the support bracket 183 relative to the head assembly bracket 182 to engage the print head 180. The eccentric cam 208 is mounted on a driven shaft 211 coupled to a motor 212 by a belt 214 and pulley 216. Accordingly, as selectively driven by the motor 212, the shaft 211 rotates the cam 208 for engaging the print head 180 which brings the print elements 186 and the ink ribbon 184 into contact with the card C.

The indicator 210 is also mounted on the shaft 211 and is configured to provide a hollow portion 213 for triggering a sensor $S_7$ of the print station PS, positioned nearby on the bracket 182 for detecting the position of the cam 208 and thus engagement of the print head 180. As suggested by its name, the indicator 210 indicates position of the print head 180, that is whether the cam 208 is raised or lowered. Only when the indicator 210 indicates that the print head 180 is lowered does the terminal T allow power to be supplied to the print elements 186.

As the print station PS uses only one ink panel 188 during one pass of the card C, the print head 180 is disengaged and the print elements 186 are de-energized for the ribbon 184 to advance to the following ink panel 188. To that end, the operation of the cam 208 is synchronized with the movement of the carriage body 37 such that printing temporarily ceases as the carriage body 37 reverses and prepares the card C for a subsequent pass through the print station PS.

Because the card C and the ink ribbon 184 are both in motion during the printing operation, rods 220 are provided adjacent and parallel with the print elements 186 to ensure a minimum offset angle between segments of the ink ribbon 184 immediately adjacent the print elements 186 and the front surface F of the card C. This arrangement of the rods 220 substantially ensures that these adjacent segments of the ink ribbon 184 lift off cleanly as the ribbon advances.

To synchronize the printing process with the advancement of the ink ribbon 184 and the movement of the carriage body 37, a rotary pulse generator ("RPG") 222 is provided as part of the print station PS and mounted in the bracket 182 such that it contacts and rests atop the supply spool 192 of the ink ribbon 184. The RPG 222 rotates with the supply spool 192 to provide pulse signals for indicating a linear measurement of the ink ribbon 184 as it advances from the supply spool 192 to the take-up spool 194. Where the length of the ink panels 188 is longer than the length of the card C, the RPG 222 is particularly useful for maintaining proper advancement of the ink ribbon 184 so that printing during a single pass is limited to operation on a single ink panel. The sensor $S_6$ (not shown) adjacent the print head 180, may sense either the presence and/or passage of the opaque strip 189 or the different ink panels 188 in the ink ribbon 184 for synchronizing the rotation of the take-up spool 192 and the carriage body 37. To that end, signals from the sensor $S_6$ and the RPG 222 may be utilized to eliminate slack in the ink ribbon 184, to readjust the rotation of the take-up spool 194 with the carriage body 37, or even to detect a breakage in the ink ribbon 184 where the take-up spool 194 advances without triggering any pulses from the RPG 222.

Figure 13A:
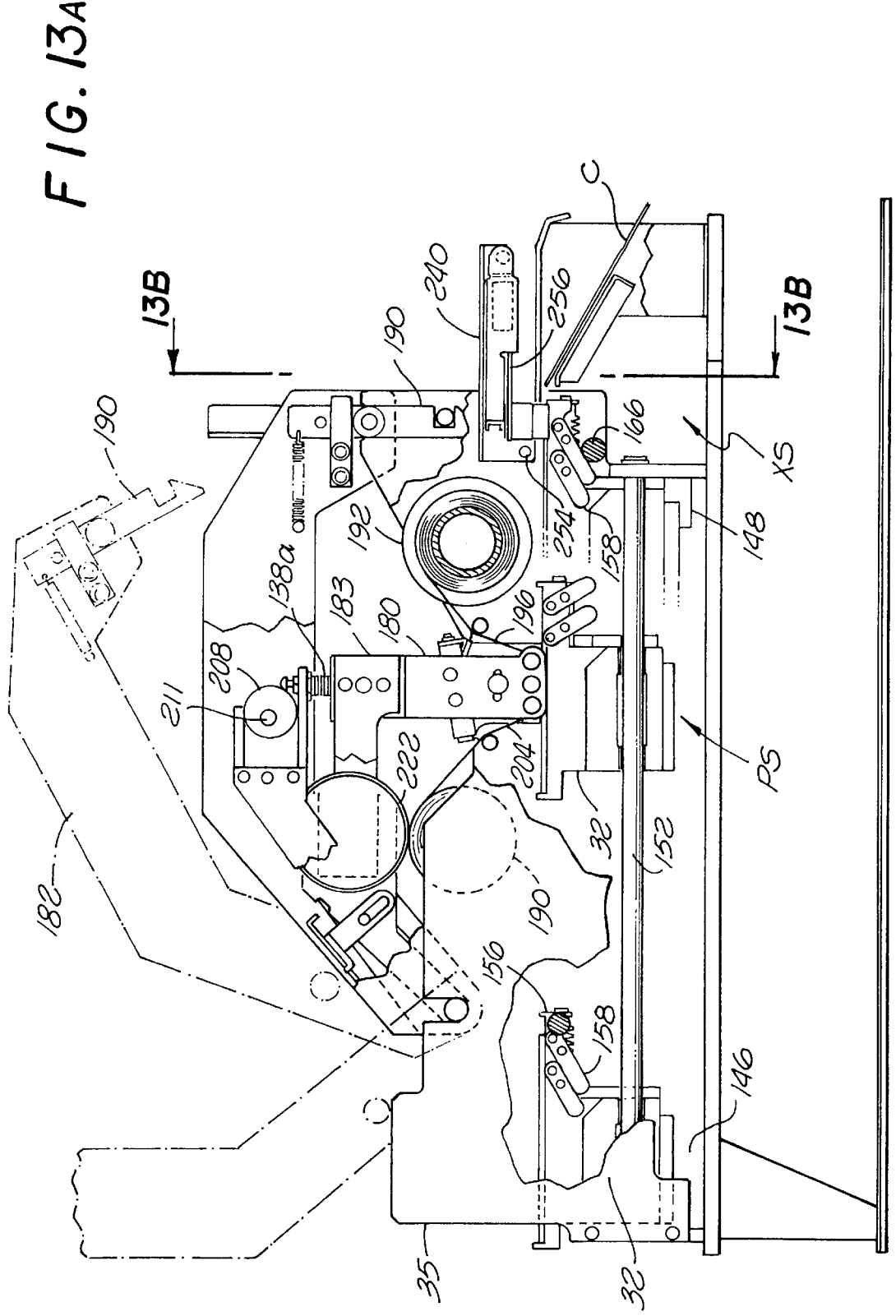
FIG. 13A is a side elevational view of the second leg of the path D, in particular, the print station, the carriage and an exit mechanism.
Figure 13B:
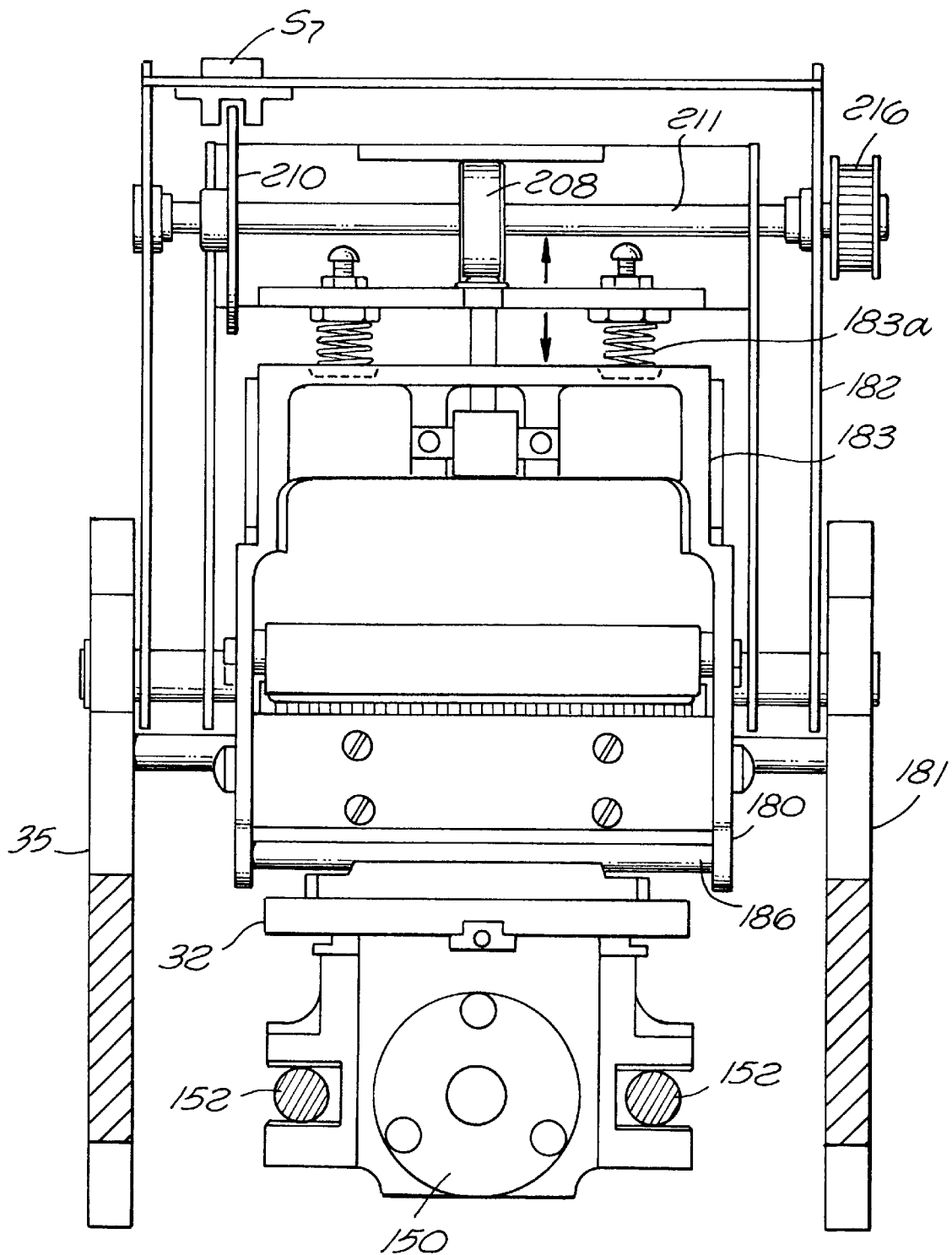
FIG. 13B is a view of FIG. 13A taken along lines 13B—13B.
Figure 14A:
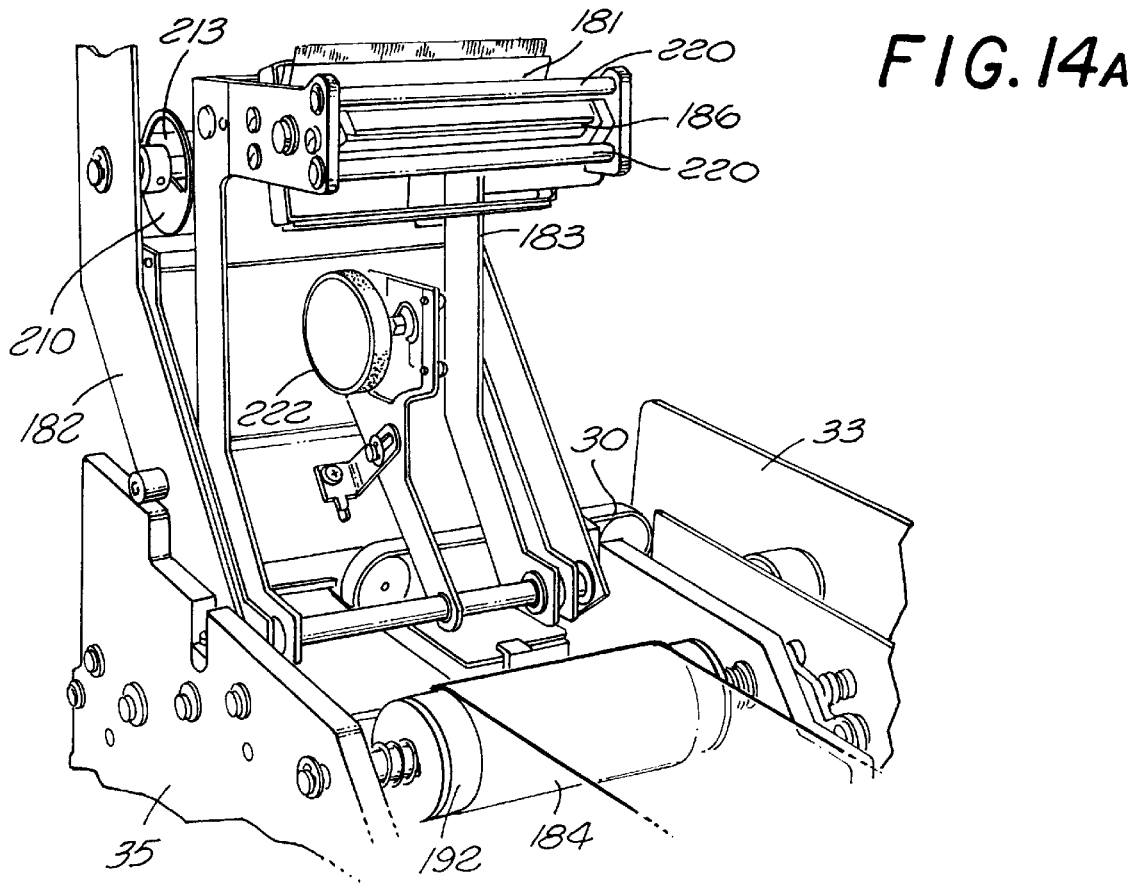
FIGS. 14A and 14B are partial perspective views of the terminal, showing the print station and components thereof.
Figure 14B:
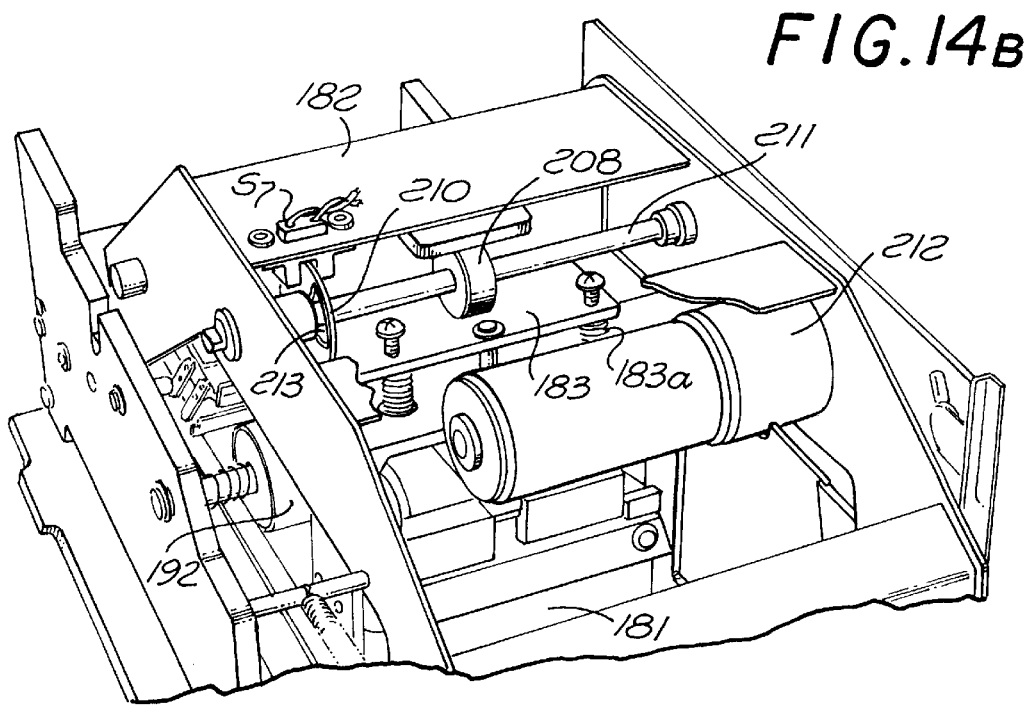
Figure 16:
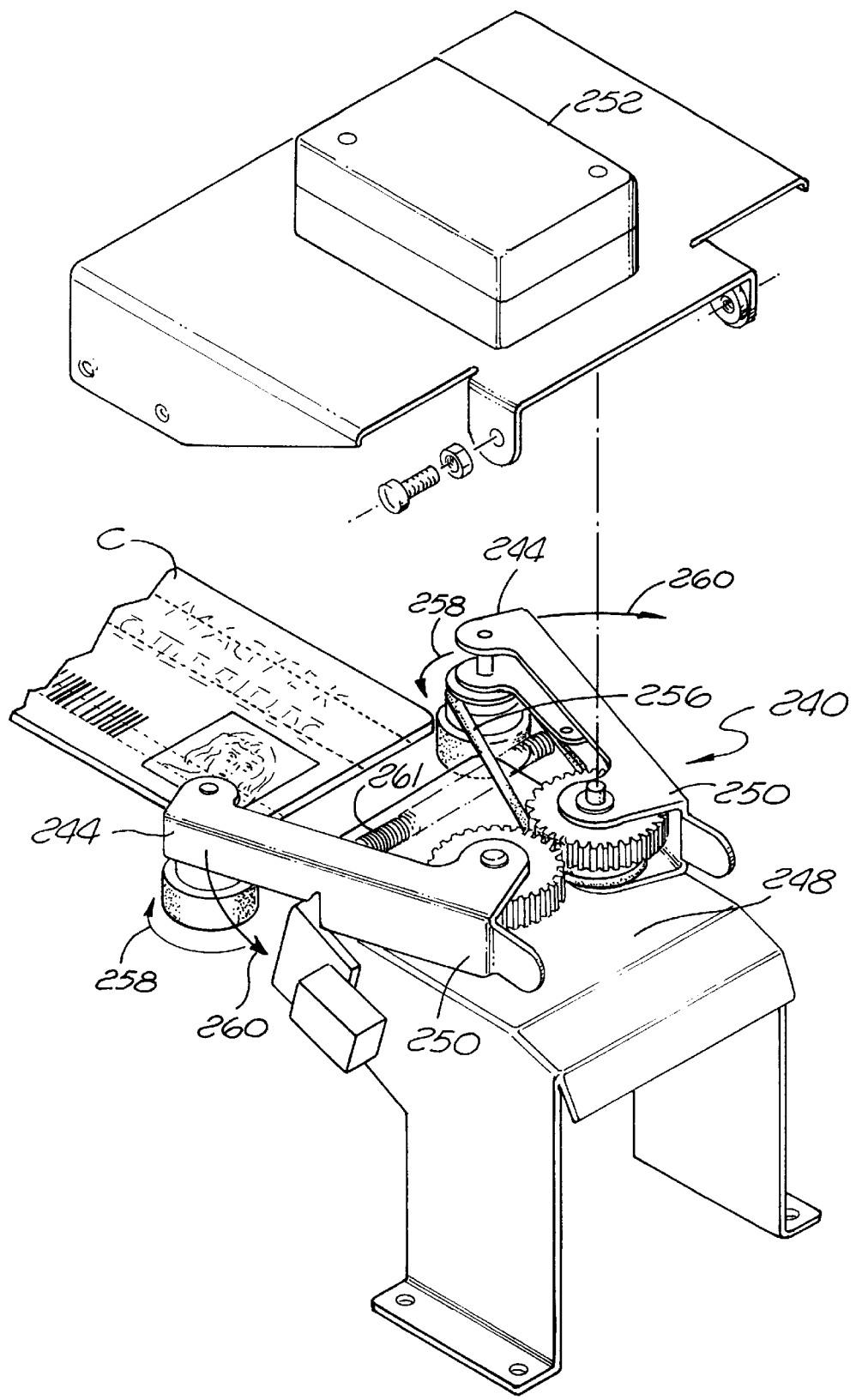
FIG. 16 is a partially exploded view of the exit mechanism in accordance with the present invention.

Referring to FIGS. 13A and 16, after completion of the print operation, the carriage body 37 transports the card C further down the second leg $L_2$ toward the unloading zone 148. As the carriage body 37 approaches the unloading zone 148, strategically placed pins 166 engage lower portions of the arms 158, holding the latter stationary as the carriage body 37 continues to advance. The pins 166 thus open the front bracket 156 against the bias of the spring 162, exposing the card C.

As the carriage C stops in the loading zone 148, the card C comes into contact with components of an exit mechanism 240 to transport the card C out of the carriage body 37, through the exit mechanism 240 and out of the terminal T through the exit port X. Better shown in FIG. 16, the exit mechanism 240 in one embodiment comprises primarily a pair of gripper rollers 242 mounted on one end 244 of opposing arms 246 defining an exit throat 248 therebetween. The other end 250 of the arms 246 are positioned adjacent a motor 252 which is coupled to the gripper rollers 242 by belts 256.

The gripper rollers 242 come into contact with the card C as the card C is transported into the unloading zone 148. Triggered by a sensor $S_8$ (not shown) positioned in the unloading zone, the motor 252 drives the belt 256 to rotate the gripper rollers 242 in the directions shown by arrows 258. The arms 246 may pivot outwardly about the ends 250 as shown by arrows 260 to accommodate the width of the card C. However, a spring 261 is provided to extend between the ends 244 of the arms 246 for maintaining minimal tension between the rollers 242 to substantially secure their engagement with the card C.

Figure 17A:
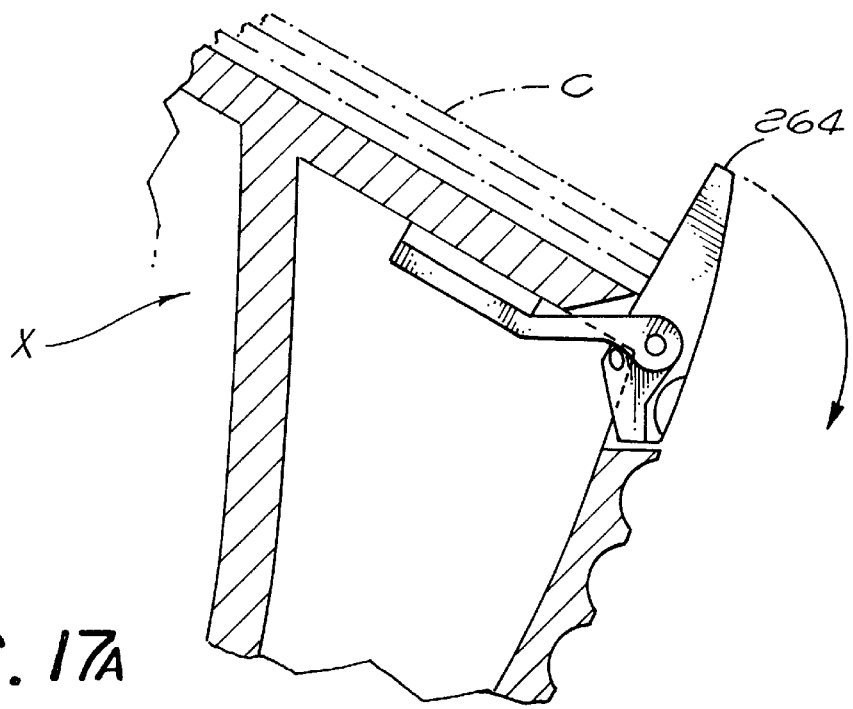
FIGS. 17A and 17B are cross-sectional views of an exit port of the present invention.
Figure 17B:
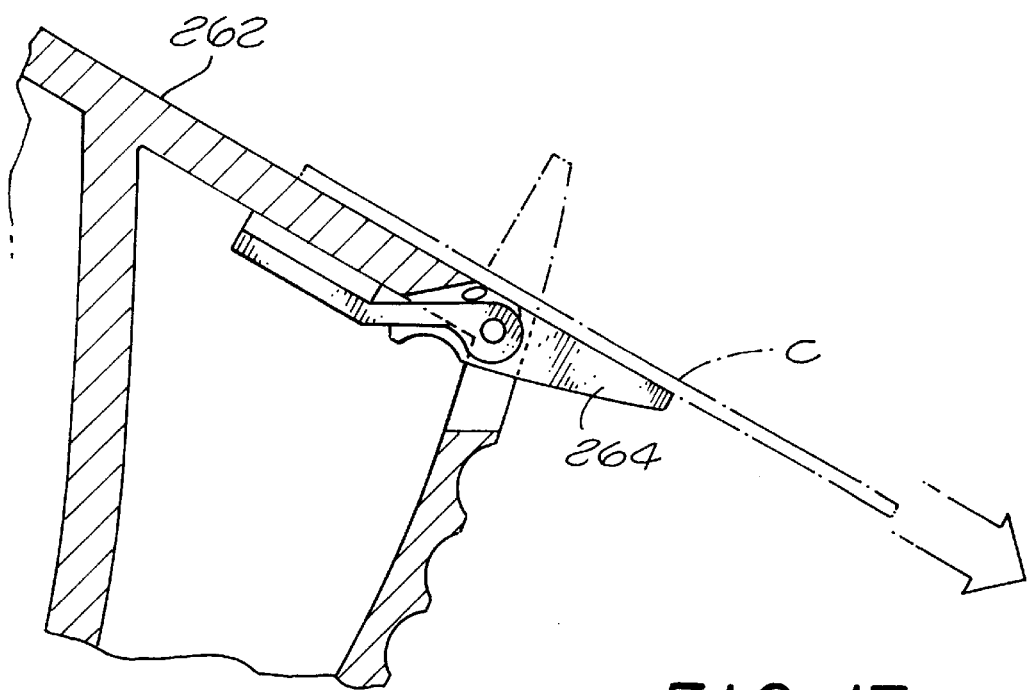

As they rotate, the rollers 242 transport the card C of the carriage body 37 and into the exit throat 248 which is downwardly sloped toward the exit port X. Referring to FIGS. 17A and 17B, the exit port X at the exterior of the terminal T provides a sloped surface 262 substantially contiguous with the exit throat 248. At the end of the sloped surface 262, a tab 264 is provided to function as a barrier in the raised position for capturing the card C as it exits the terminal T (FIG. 17A). The tab 264 may also be lowered to allow the card C to pass completely through the exit port X.

Figure 19:
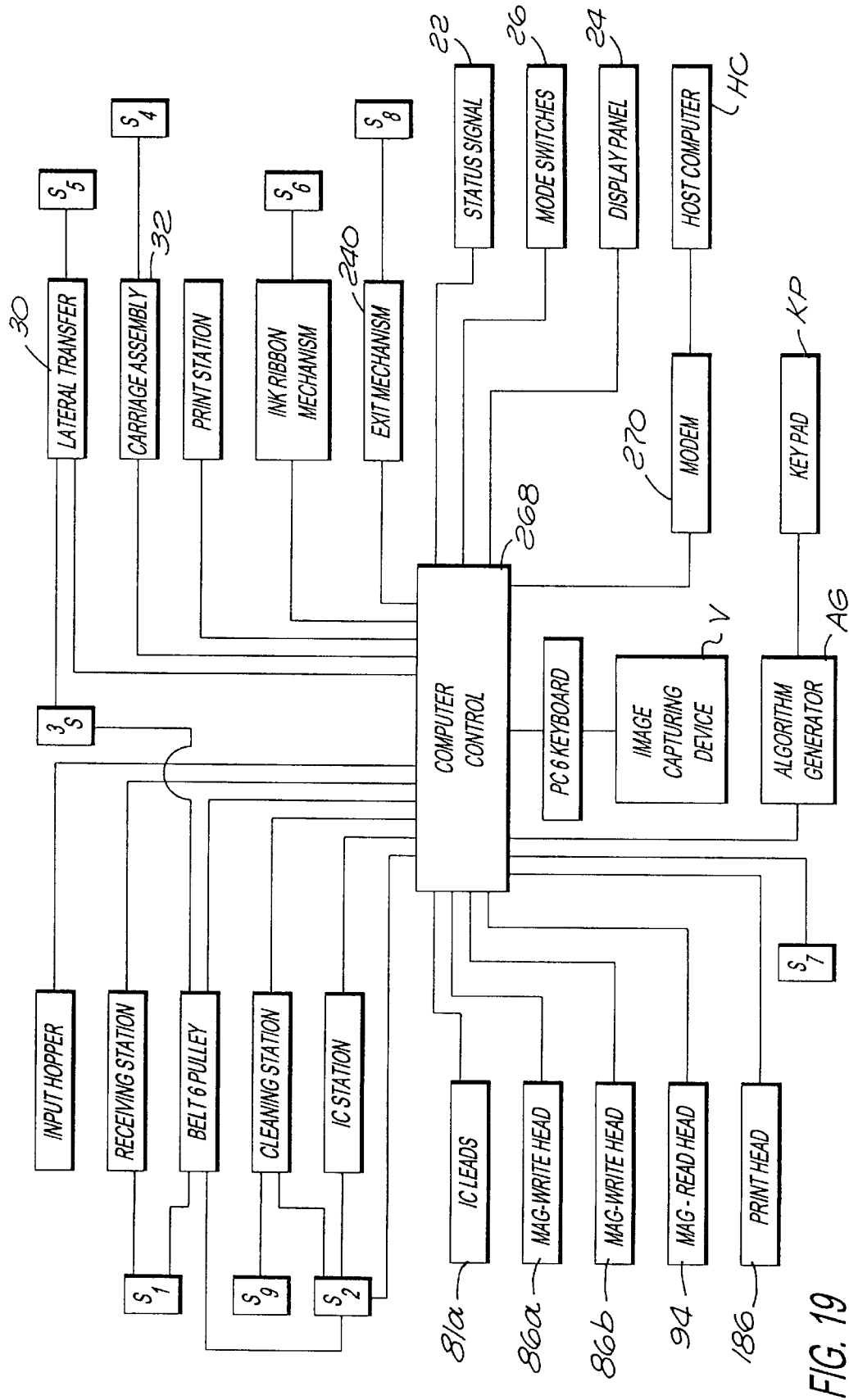
FIG. 19 is a block diagram of the operating electrical components of the instant terminal.

Referring primarily to FIGS. 5 and 19, an illustrative example of the terminal T in operation now follows. In accordance with the present invention, the terminal T may issue and process a card, or update and/or revise a card. With power supplied to the terminal T, operating communications between the operator and the terminal T are enabled via the status signals 22, mode switches 26 and the display panel 24. If desired, human-readable data in the form of a photo-image may be captured by an image capturing device 266 and be input to the control computer 268 for application on the front surface F of the card C. For purposes here, the control computer 268 is representative of the main circuit board 19 (FIG. 4) subject to operating software. The control computer 268 may also be connected to a modem 270 for communication with a remote host computer (not shown) providing or receiving data applied or stored on the card C.

The operator may send the appropriate command to the terminal T via the mode switches 26 to initiate operation. If a PIN is to be selected, the operator may instruct the control computer 268 to activate the PINpad PP for receiving a selected input or PIN on the keypad KP. The algorithm generator AG may then encrypt the PIN into a secure PIN block for transmission to the control computer 268. The control computer 268 may then have an option of sending the encrypted PIN block to the host computer HC, e.g., via the modem 270. Whether or not the control computer 268 sends the encrypted PIN block, the control computer 268 may then extract the clear-text PIN from the PIN block and re-encrypt the PIN to generate the coded input ("offset") for storage on the magnetic stripe $M_P$ as an added security measure against fraud. Thereafter, the operator may trigger the control computer 268 to initiate operation of the input hopper mechanism 34 (inclusive of the motor 39, the rollers 42 and the belts 44), for dispensing a blank card from the stacker 36, or the operator may manually insert a card through the entry port E, to be received by the receiving station RS. In any event, the card C at the receiving station RS triggers the sensor $S_1$ which initiates operation of the solenoid 54 for the roller 50 of the receiving station, and the motor 28 for the belt and pulley arrangement 27 along the first leg $L_1$. With activation of the motor 28, all of the transport rollers along the first leg $L_1$ are ready to transport the card C.

The card C is thus transported out of the receiving station RS toward the cleaning station CS. The feeder roller 60 of the cleaning station CS passes the card C under the cleaning head 62 which effectively wipes the front surface F of the card with the cloth 64. With dirt and debris removed from the front surface F, contamination within the terminal is substantially reduced and the card C is prepared for the printing operation on the second leg $L_2$. The cleaning station CS may provide a sensor $S_9$ (not shown) to indicate discontinuity in the cleaning cloth.

After being cleaned, the card C is then transported by the rollers 80 of the belt and pulley arrangement 27 to the smart-card station ICS, if such station is provided in the terminal T. As mentioned earlier, the sensor $S_2$ or additional sensors (as part of the station ICS) may be triggered to temporarily cease operation of the rollers of the belt and pulley arrangement 27 to allow the card C to be stationary in the station ICS. The solenoid-activated leads 81a may then make contact with the chip CH for electronic data transfer. The sensor $S_2$ or such additional sensors may also signal the motor 71 of the cleaning station CS to advance the cleaning cloth 64. Once contact between the leads 81a and the chip CH is made, information provided by the control computer 268 may be written on the chip CH and/or information on the chip CH may be read into the control computer 268.

After completion of the data transfer operation with the chip CH, the station ICS may communicate with the control computer 268 to retrigger the motor 28 of the belt and pulley arrangement 27 to transport the card C to the magnetic-write station WS. Of course, if the terminal T does not provide the smart-card station ICS, the belt and pulley arrangement 27 would transport the card C substantially without interruption from the cleaning station CS to the magnetic-write station WS.

As the card C approaches the magnetic-write station WS, the sensor $S_2$ senses the leading edge of the card C and signals the magnetic write heads 86a and 86b, via the control computer 268, to synchronize the magnetic-write operation. Accordingly, the write operation with new data or update data is performed on either or both of the magnetic stripes $M_P$ and $M_S$ as the card C passes through the write station WS.

As the card C then passes through magnetic-read station MRS, the read head 94 also using the signal from the sensor $S_2$ reads the magnetic stripe $M_P$. Accordingly, data encoded on the magnetic stripe M is read into the control computer 268 for verification.

As mentioned, if the control computer 268 detects an error in the encoded data, the control computer 268 interrupts the operation of the belt and pulley arrangement 27 and directs the motor 28 to reverse, returning the card C to the magnetic-write station WS for another pass for the rewrite operation. Thereafter, the belt and pulley arrangement 27 transports the card C to the read station MRS for a reread operation.

If the read operation indicates a verification of the data encoded on the magnetic stripe $M_P$, the control computer 268 does not interrupt the operation of the belt and pulley arrangement 27 and the card C is transported out of the read station MRS toward the end 89 of the first leg $L_1$. Accordingly, all electronic data transfer with the card C is completed along the first leg $L_1$.

At the end 89 of the first leg $L_1$, the sensor $S_3$ indicates the presence of the card C and triggers the cessation of operation of the belt and pulley arrangement 27 and the lateral transfer mechanism 30 to transport the card C from the first leg $L_1$ to the second leg $L_2$. In particular, the gear box 98 of the lateral transfer mechanism 30 is activated by the sensor $S_3$ to lower the structure 96 which upon contact with the card C draws the card C across the surface 29 toward the carriage body 37.

At the loading zone 146, the card C drops onto the carriage body 37 which waits for the card C while the front bracket 156 is held open by the pins 164. The sensor $S_4$ adjacent the lateral transfer mechanism 30 senses the passing of the card C from the first leg $L_1$ to the second leg $L_2$ and triggers a predetermined delayed operation of the motor 153 to activate the carriage assembly 32.

When the carriage body 37 carrying the card C later departs the loading zone 146, the lateral positioning mechanism 168 mechanically aligns the card C on the carriage body 37, and the front bracket 156 closes to secure the card C. The sensor $S_5$ at the loading zone 146 detecting the departure of the carriage body 37 triggers the gear box 98 of the lateral transfer mechanism 30 to return the structure 96 to the upper position.

Gauging the advancement of the carriage body 37 down the second leg $L_2$ via the lead screw 150, the control computer 268 coordinates operation of the print station PS with the operation of the carriage assembly 32. In particular, the control computer 268 triggers the motor 212 for the engagement of the print head 180, energizes the print elements 186, and triggers the motor 199 for advancing the ink ribbon 184 to accomplish printing of the visual indicia bearing human-readable data. To that end, the print elements 186 of the print head 180 are selectively energized to print the desired text, logos, photo-images, etc.

To enable multi-color printing, the control computer 268 controls the operations of the print station PS and the carriage assembly 32 to enable multiple passes of the card C through the print station PS, each pass enabling the printing of a single color, followed by the bar codes and then the application of the protective layer.

When the printing operation has been completed, the control computer 268 instructs the carriage assembly 32 to transport the card C to the unloading zone 148. As the carriage body 37 arrives at the unloading zone, the front bracket 156 of the carriage body 37 is mechanically opened by the pins 166 pivoting the arms 158. The card C is then exposed to the exit mechanism 240 which is triggered by the sensor $S_8$ sensing the arrival of the carriage body 37. The sensor $S_8$ activates the motor 252 to drive the gripper rollers 242 which draws the card C off the carriage body 37 and through the exit throat 248. The card C then exits the exit port X where the card C is either captured by the tab 264 at the exit port X or slides over the tab 264 and out of the terminal T.

With completion of the card C, the control computer 286 prepares the terminal T for receiving another instruction from the operator to issue and/or process another card, either dispensed from the stacker 36 or entry-fed to the receiving station RS.

It is to be noted that all of the stations and the various transport mechanisms communicate with the control computer 268 such that malfunction within the stations and the transport mechanisms are known to the control computer 268. Accordingly, the control computer 268 may display appropriate messages on the display panel 24 for repair and maintenance of the terminal T.

In accordance with the present invention, the card C may carry visual indicia on the front surface F comprising human-readable data, such as text, logos, background designs and a photo-image, and perhaps bar codes on the front surface F. And, where the card C carries the chip CH, the card C may also carry data stored on the chip. Likewise, on the back surface B of the card C, the magnetic stripes $M_P$ and $M_S$ may store new or updated data. The card C is thus convenient for use as a financial transaction card, bearing information relating to credit, debit, PIN, etc., and/or an identification badge, bearing a photo-image, text, and other visual indicia. The printed bar code on the front surface F the card C, of course, may serve as a key for entry onto secured premises or be representative of other identifying information.

Referring to FIGS. 4 and 18A–18C, the terminal T is contained in a housing H which comprises the front section 14, the rear section 16, the top section 13 and the side vent sections 20. As earlier mentioned, the top section 13 is pivotally attached to the rear section 16 and may be supported in the open position by a telescoping arm 300 mounted to the rear section 16. Accordingly, the top section 13 may be lifted to facilitate maintenance or repair of the terminal T. However, if better access to the various stations of the terminal T is desired, the rear section 16 may be removed from the terminal T.

Figure 18A:
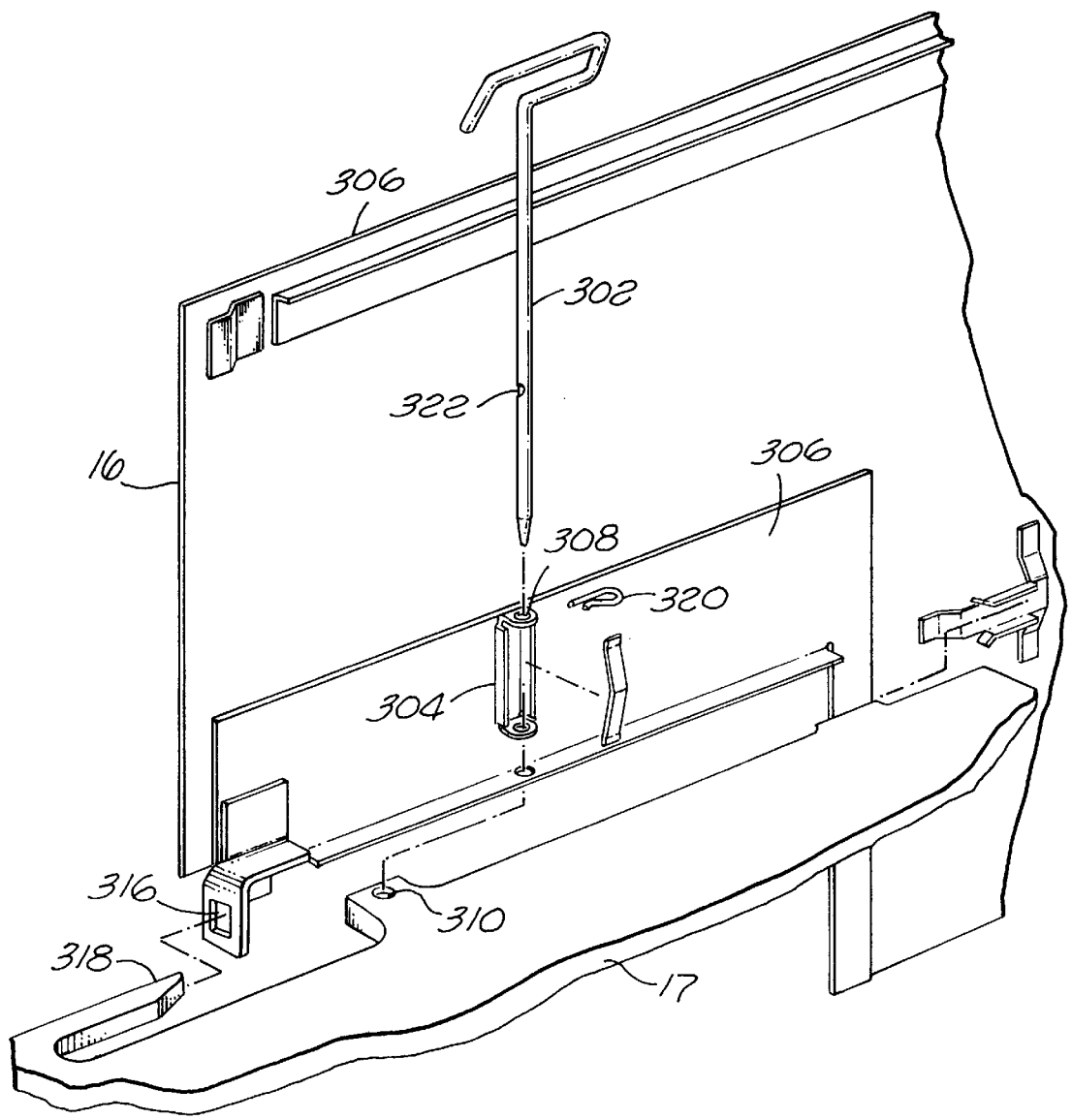
FIG. 18A is a partial perspective view of an elongated pin for the housing H of the instant invention.
Figures 18B, 18C:
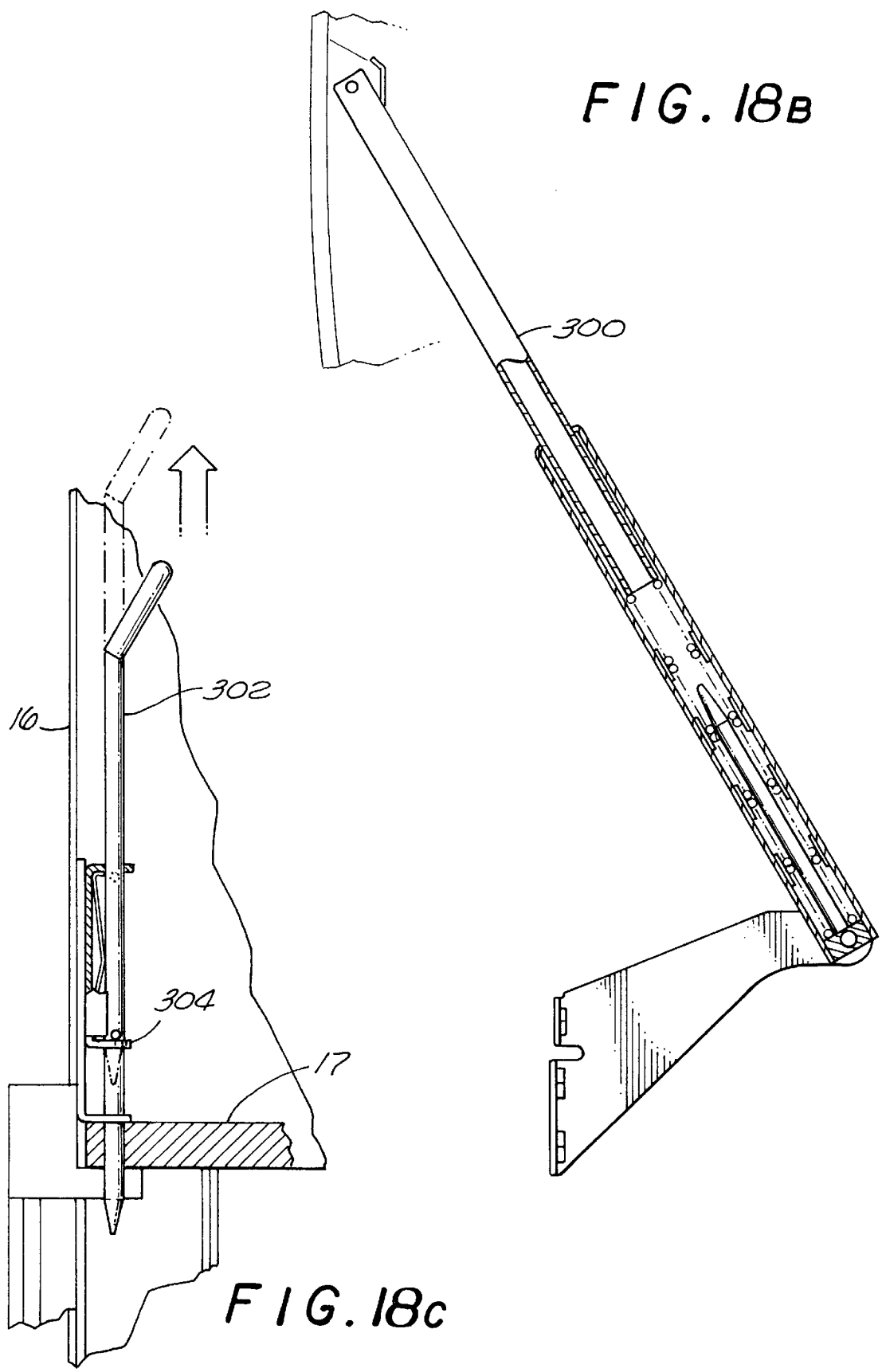
FIGS. 18B–18C are cross-sectional views of a supporting arm for the housing H and the pin of FIG. 18A, respectively.

As best shown in FIGS. 18A and 18B, the rear section 16 is secured to the terminal T by a pair of elongated pins 302 which engage a pair of brackets 304 fixedly mounted to opposing side panels 306 of the rear section 16. Bores 308 provided in the brackets 304 are configured to match bores 310 provided in the base panel 17. Moreover, both bores 308 and 310 also match bores 312 provided in a top flange 314 of the side vents 20 (FIG. 4). Accordingly, when the rear section 16 and the side vents are in place on the terminal T, the pins 302 may be inserted through the bores 308 of the brackets 304, the bores 310 of the base panel 17, and the bores 312 of the side vents 20, to secure the housing H as a whole about the terminal T. The pins 302 may be releasably locked to the bracket 308 by a clip 320 inserted through a bore 322 in the pins 302.

In addition to the pins 302, the opposing side panels 306 may be configured to provide an opening 316 to receive an insert 318 configured from the base panel 17 to facilitate alignment between the rear section 16 and the terminal T.

Accordingly, the rear section 16 may be easily removed from the terminal T by first removing the pins 302 from the bracket 304 and then sliding the rear section 16 off the insert 318. Likewise, to replace the rear section 16, the rear section 16 is first hinged to the terminal T at the insert 318 and the pins 302 are then inserted through the bracket 304, the base plate 17 and then the side vents 20.

It may be seen that the structure of the present invention may be readily incorporated in various embodiments to provide a terminal T. The various components and dimensions disclosed herein are merely exemplary and may not be to scale. Of course, various alternative techniques may be employed departing from those disclosed and suggested herein. For example, various belts and pulley arrangements may be provided to transfer the card C down the first leg $L_1$, so long as the requirements of the smart card, magnetic-write and magnetic-read stations are met. Likewise, the lateral transfer mechanism may be configured differently so long as it transfers the card from the first leg to the second leg of the path D. Moreover, the carriage may be configured differently so long as it meets the requirements of the printing station.

Consequently, it is to be understood that the scope hereof should be determined in accordance with the claims as set forth below.

What is claimed is:

1. A compact terminal for processing plastic cards, said cards bearing personalized human-readable and machine-readable data, said terminal comprising:

a housing defining a segmented horizontal path between an entry port and an exit port on which a card is transported within the terminal, said path comprising respective spaced-apart first and second segments disposed on each end of a lateral segment, said first and second segments disposed in substantially parallel relationship and defining respective opposite directions of transport;

a receiving station positioned adjacent said entry port for feeding said cards onto said path;

a magnetic transducer for processing at least a portion of said machine-readable data;

a printer for printing said human-readable data; and a transport system within said terminal for transporting said cards on said path, said transport system comprising a mechanism laterally transporting said card between said first and second segments and along said lateral segment.

2. A terminal in accordance with claim 1, further comprising a cleaning station for cleaning a surface of said cards transported through said terminal.

3. A terminal in accordance with claim 2 wherein said cleaning station comprises a silk cleaning cloth placed in contact with said cards.

4. A terminal in accordance with claim 1, wherein said path is substantially U-shaped.

5. A terminal in accordance with claim 1, wherein said transport system further comprises a carriage assembly for transporting said cards along said second segment of said path.

6. A terminal in accordance with claim 5, wherein said carriage assembly comprises a lead screw and a carriage body advanced by said lead screw.

7. A terminal in accordance with claim 1, wherein said receiving station comprises an input hopper mechanism and a manual feed entry.

8. A terminal in accordance with claim 1, wherein said transport system further comprises a belt and pulley arrangement for transporting said cards along said first segment of said path.

9. A terminal in accordance with claim 8, wherein said belt and pulley arrangement drives various rollers, at least some of which are positioned angularly offset from said path for ensuring proper alignment of said cards while being transported along said first segment of said path.

10. A terminal in accordance with claim 1, wherein said cards bear a magnetic stripe for storing at least said portion of said machine-readable data, and said magnetic transducer comprises read and write heads for accomplishing data-processing of said selected machine-readable data stored on said magnetic stripe.

11. A terminal in accordance with claim 1, wherein said cards bear an integrated-circuit.

12. A terminal in accordance with claim 1, further comprising a PINpad for a selection of a PIN.

13. A terminal in accordance with claim 1, further comprising a controller circuit for controlling operations of said terminal, said controller circuit comprising a PCMCIA card.

14. A terminal in accordance with claim 1, further comprising a hopper positioned adjacent said receiving station to store blank cards.

15. A terminal in accordance with claim 1, wherein said printer prints bar codes.

16. A terminal in accordance with claim 1, wherein said human-readable data comprises an image, said printer printing said image on said cards as provided to said terminal by an image capturing device coupled to said terminal.

17. A terminal in accordance with claim 1, wherein said card bears a plurality of magnetic stripes separately located on said card.

18. A terminal in accordance with claim 1, wherein said cards bear integrated circuits and said terminal further comprises an integrated-circuit station comprising solenoid-activated leads for accomplishing electronic data transfer with said integrated circuits of said cards.

19. A terminal in accordance with claim 1, wherein said lateral transfer mechanism comprises a gear box and a belt and pulley structure driven by said gear box, wherein said belt draws said cards across said lateral segment.

20. A method of processing plastic cards to maximize the compactness of a card processing terminal, said terminal including a housing having an entry port and an exit port and a plurality of card processing stations, said method including the steps of:

defining a segmented horizontal path between said entry port and said exit port on which a card is transported within said terminal, said path comprising respective spaced-apart first and second segments disposed on each end of a lateral segment, said first and second segments disposed in substantially parallel relationship and defining respective opposite directions of transport;

positioning said plurality of stations along said segmented path;

transporting said cards along said path to each of said plurality of stations; and processing said cards at said respective stations.

21. A method according to claim 20 wherein said transporting step includes:

selecting a transport system including a belt and pulley mechanism, a carriage assembly and a lateral transport mechanism;

guiding said cards along said first segment with said belt and pulley mechanism;

carrying said cards along said second segment with said carriage assembly; and shifting said cards between said first and second segments along said lateral segment with said lateral transport mechanism.

22. A method according to claim 20 wherein said plurality of stations include a receiving station, a cleaning station, a magnetic transducer station and a print station and said processing step includes the steps of:

feeding said cards into said path from said receiving station;

cleaning said cards to minimize contamination of said terminal interior;

writing machine-readable data on said clean cards at said magnetic transducer station;

printing personalized human-readable data on said cards at said printing station; and exiting said cards from said exit port.

23. A method according to claim 22 wherein said printing step further includes generating machine-readable data.

24. A method according to claim 23 wherein said generating step includes writing bar codes on said cards.

25. A method according to claim 22 wherein said printing step further includes applying a protective layer over said human-readable and machine-readable data for increasing the durability of said printed indicia.

* * * * *